(12) United States Patent
Yamaki

(10) Patent No.: US 6,701,232 B2
(45) Date of Patent: Mar. 2, 2004

(54) VEHICLE MANAGEMENT SYSTEM

(75) Inventor: Masahito Yamaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/128,236

(22) Filed: Apr. 24, 2002

(65) Prior Publication Data

US 2002/0161495 A1 Oct. 31, 2002

(30) Foreign Application Priority Data

| Apr. 25, 2001 | (JP) | 2001-127956 |
| Apr. 25, 2001 | (JP) | 2001-127957 |
| Apr. 25, 2001 | (JP) | 2001-127958 |
| Apr. 25, 2001 | (JP) | 2001-127959 |
| Apr. 25, 2001 | (JP) | 2001-127960 |
| Apr. 25, 2001 | (JP) | 2001-127961 |
| Apr. 25, 2001 | (JP) | 2001-127962 |
| Apr. 26, 2001 | (JP) | 2001-130054 |
| Apr. 26, 2001 | (JP) | 2001-130055 |
| Apr. 26, 2001 | (JP) | 2001-130056 |

(51) Int. Cl.$^7$ .................. G06F 19/00; G01M 15/00
(52) U.S. Cl. .................................... 701/33; 701/29
(58) Field of Search ............................ 701/29, 33, 34

(56) References Cited

U.S. PATENT DOCUMENTS

| 5,442,553 | A | * | 8/1995 | Parrillo ................. 455/420 |
| 5,781,871 | A | * | 7/1998 | Mezger et al. ............ 455/424 |
| 6,181,994 | B1 | * | 1/2001 | Colson et al. .............. 701/33 |
| 6,263,265 | B1 | * | 7/2001 | Fera ......................... 701/19 |
| 6,330,499 | B1 | * | 12/2001 | Chou et al. ................. 701/33 |
| 6,339,736 | B1 | * | 1/2002 | Moskowitz et al. .......... 701/70 |
| 6,362,730 | B2 | * | 3/2002 | Razavi et al. .............. 340/438 |
| 6,487,717 | B1 | * | 11/2002 | Brunemann et al. ........ 717/173 |
| 6,505,106 | B1 | * | 1/2003 | Lawrence et al. ........... 701/35 |
| 6,553,291 | B2 | * | 4/2003 | Matsui ....................... 701/33 |
| 2002/0133273 | A1 | * | 9/2002 | Lowrey et al. .............. 701/29 |

FOREIGN PATENT DOCUMENTS

JP 7-15427 2/1995

* cited by examiner

Primary Examiner—Michael J. Zanelli
(74) Attorney, Agent, or Firm—McGinn & Gibb, PLLC

(57) ABSTRACT

A vehicle management system for monitoring vehicle maintenance conditions includes a self-diagnosing system mounted on a vehicle for monitoring a control system by an on-board diagnosis apparatus and for storing a diagnosis information with first data related to a target diagnosis when an abnormality is recognized and second data being close to a trouble determination level even though within a normal range. A data communication system transmits the diagnosis information to an outside receiver via a wireless communication. An external database system receives the diagnosis information to accumulate it. A network system analyzes the second data and distributes an analyzed result to at least one of a user of the vehicle and a department with an access right to the database system.

17 Claims, 19 Drawing Sheets

VEHICLE MANAGEMENT SYSTEM

BACKGROUND OF THE INVENTION

1. Field of the Invention

The present invention relates to a control system for monitoring vehicle maintenance conditions, and more particularly to the control system for integrally monitoring diagnosis informations of power units thereof.

2. Description of the Related Art

A power unit and other auxiliary systems of a vehicle are generally monitored by an on-board diagnosis apparatus. An engine is diagnosed by an on-board control unit with a self-diagnosis system on the following points; malfunctions of various actuators such as solenoid valves, driving motors and relays; malfunctions of various sensors such as an air flow sensor and a crank angle sensor; an existence of disconnections and short-circuits in electronic systems including input/output units such as various actuators, sensors, etc.; the existence of a leak in purge systems in which evaporating gas generated in a fuel tank is once adsorbed and stored in activated charcoal or the like packed in a canister and the evaporating gas in the canister is taken into and burnt in a combustion chamber through an intake passage under a preset engine condition so that the evaporating gas is prevented from being exhausted to the atmosphere; a malfunction of a thermostat used for a coolant recirculation system; the existence of an abnormality in a fuel system; a degradation of a catalyst for cleaning exhaust gases; the existence of the abnormality in an exhaust gas recirculation (EGR) system in which a portion of the exhaust gases is recirculated to the intake side for burning again; and the existence of a misfire in an ignition system. When any abnormal states are detected by the on-board diagnosis system based on the self-diagnosing system, a warning lamp or the like is lit up to send an alarm signal to a driver, thereby inspiring the driver to check and repair the vehicle in a dealer's service factory. In the service factory, an external device, e.g., a trouble diagnosing device, is connected to an on-board electronic control unit for reading internal data, such as trouble location data and trouble data, from the on-board electronic control unit. Check and repair are then performed based on the read data.

One example of such a trouble diagnosing device is disclosed in Japanese Examined Patent Application Publication No. 7-15427 filed by the assignee of this application. The disclosed trouble diagnosing device is able to read the data in the on-board electronic control unit, i.e., detected signals from various sensors and switches, control signals outputted to various actuators such as fuel injectors, computation data within the system which are stored in the on-board electronic control unit, by utilizing the diagnosing device or by connecting a computer for an external expert system to the diagnosing device. As a result, it is possible to pursue the trouble location or the cause of trouble and to perform necessary repair or adjustment.

However, it has been conventional that, although the on-board diagnosis can detect a sign appearing before the occurrence of trouble due to, e.g., deterioration with time-dependent changes in parts and systems, the on-board diagnosis is utilized just for lighting up a warning lamp, for example, when the trouble has actually occurred under normal usage conditions. In the event of the trouble being actually occurred, the check and repair can be started only after reading out the diagnosis data with an external trouble diagnosing device. Furthermore, on that occasion, the trouble cause and the trouble location, including associated portions, are spread over a broad range in many cases. Therefore, a long time period is required to pursue the trouble causes, and increased is a burden imposed on both users and service factories in terms of time and cost.

SUMMARY OF THE INVENTION

Accordingly, it is an object of the present invention to provide a vehicle control system for an effective utilization of diagnosis informations of a power system mounted on a vehicle which can integrally execute diagnosing operations thereof and can give a beforehand notice of checked results before an occurrence of trouble in order to improve a system reliability.

In summary, the diagnosis informations of the power system is accumulated in an external database, and maintenance conditions of the vehicle are diagnosed on the basis of the diagnosis information accumulated with the vehicle control system of the present invention as described as above. Diagnosis results are distributed to a user of the vehicle and a person having an access right (authority) to the database. Accordingly, the notice given previously is given to the user before an abnormality actually occurs in the vehicle, whereby safety measures are secured. In addition, the diagnosis results are fed back to the person in order to reflect the results to development procedures for quality control departments and for engineering development departments and to contribute to an improvement of a total system reliability.

The other features and advantages of the present invention will be clearly understood from the following descriptions.

DETAILED DESCRIPTION OF THE PREFERRED EMBODIMENTS

Figure 1:
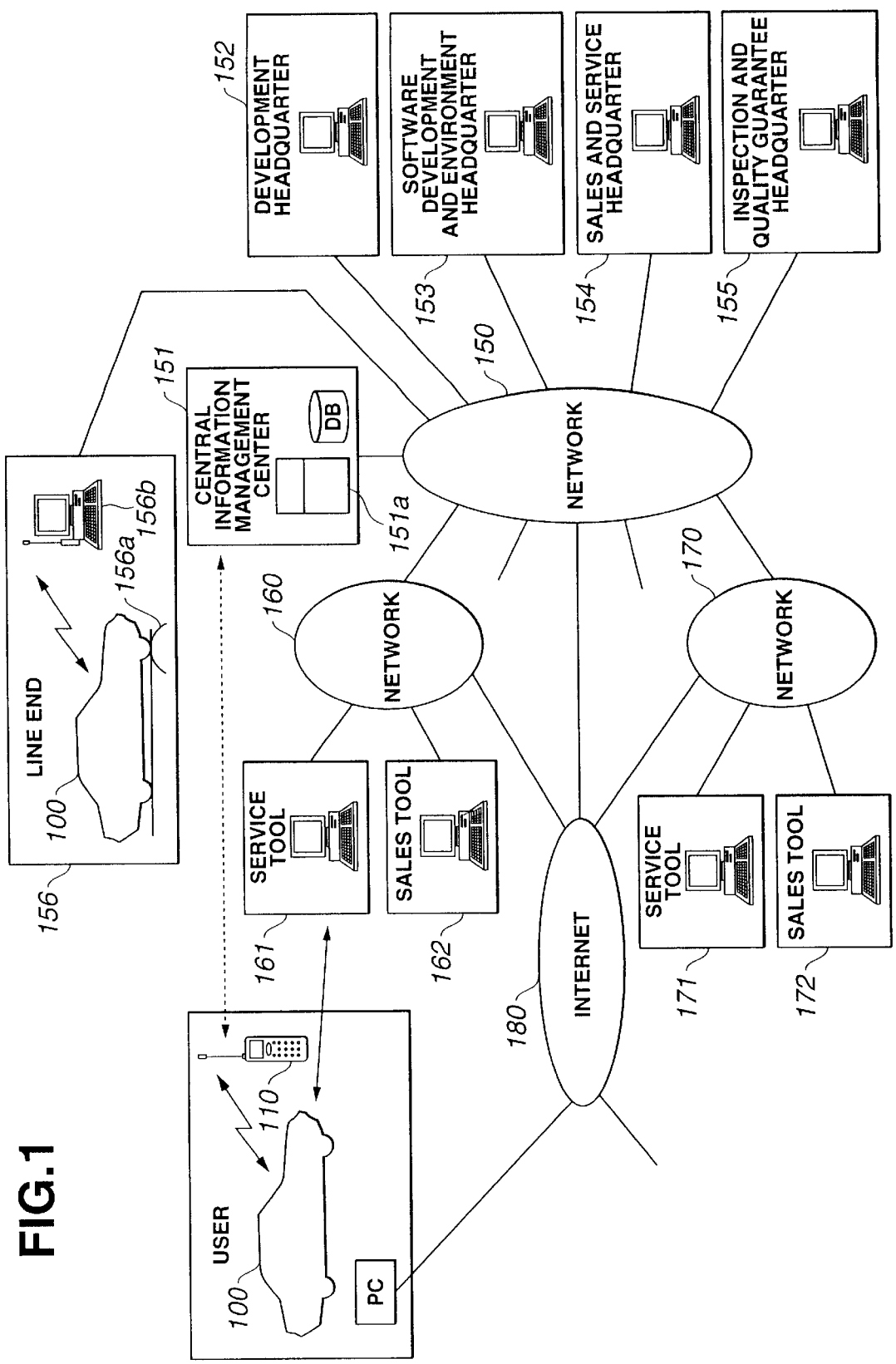
FIG. 1 is a block diagram of an overall configuration of a vehicle control system.

FIG. 1 shows a vehicle control system for accumulating (compiling) initial values of vehicle control informations on a production line, for controlling vehicle maintenance conditions of vehicles after being marketed and purchased by users in real time for 24 hours, and for providing the user with the latest information of the vehicle. In the vehicle control system, each vehicle 100 marketed and purchased by the user includes a wireless (radio) communication terminal 110 as data communication means that can wirelessly communicate data from an on-board control unit (vehicle information) to an outside receiver in real time. The vehicle information transmitted via the wireless communication terminal 110 is accumulated and compiled as a database DB in a host computer 151a provided in a central information control center 151.

A mobile wireless communication system via a base station (not shown), a satellite communication system or an artificial satellite (not shown), for example, can be utilized for a data communication between the vehicle 100 and the central information control center 151. Also, the wireless communication terminal 110 for transmitting the vehicle information of the vehicle 100 has a communication terminal connected to the control unit of the vehicle 100 through a harness. However, the wireless communication terminal 110 preferably uses a small-sized communication terminal separated in a portable unit from the vehicle 100 and performs wireless communication between thereof and the on-board control unit. This embodiment employs, as such a portable communication terminal, a portable telephone (cellular phone) for an exclusive use with a built-in communication circuit for the wireless communication between the phone and the on-board control unit. Hence, the wireless communication terminal 110 will be described as the cellular phone 110 hereinafter. Note that, when the user has the cellular phone, the communication terminal may be one connectable to the cellular phone for the data communication.

Figure 2:
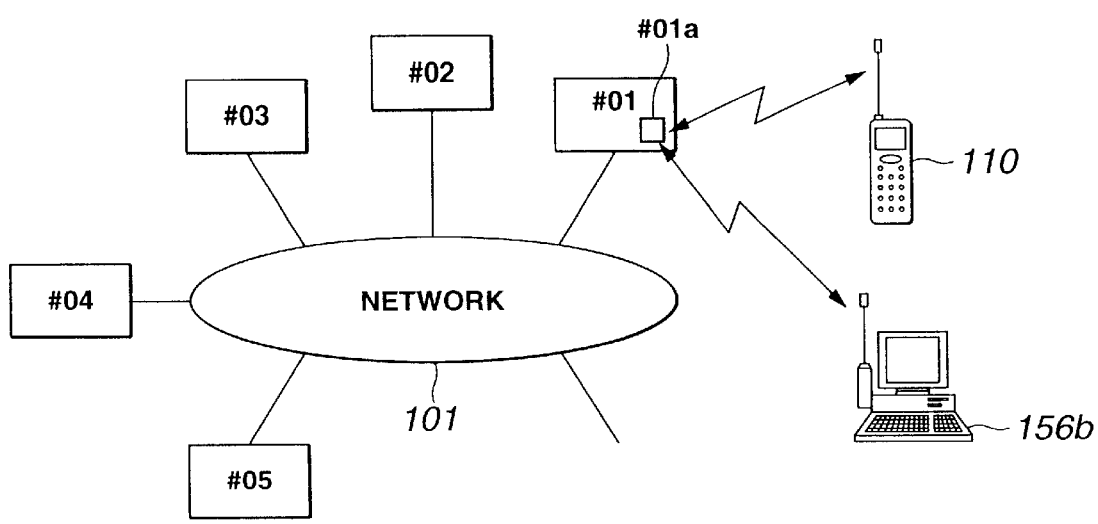
FIG. 2 is a diagram for explaining a vehicle network system.

In this embodiment, therefore, when a single control unit is installed in the vehicle 100, a communication circuit for controlling wireless communication is incorporated in the control unit. Also, when a plurality of the control units are installed in the vehicle 100, for example, when a plurality of control units #01, #02, #03, #04, #05, . . . are installed as shown in FIG. 2, the control units #01, #02, #03, #04, #05, . . . are preferably interconnected via a network 101 so that individual pieces of control information are unified. Then, a communication circuit #01a for controlling the wireless communication is incorporated in a predetermined one, e.g., the control unit #01, of the plurality of control units connected to the network 101. Additionally, the network 101 is a vehicular network adapted for a real time control. Also, wireless communication between the communication circuit and the onboard control unit can be realized by using a communication system in conformity with Bluetooth standards for implementing a short-distance wireless communication and/or any other applicable standards.

The communication circuit #01a provided in the control unit of the vehicle 100 makes it possible to perform not only the wireless communication between thereof and the cellular phone 110, but also the wireless communication between thereof and an inspection tool provided in the factory production line at a terminal end thereof or a service tool provided in service factory of the dealer. Further, each of the control units #01, #02, #03, #04, #05, . . . installed in the vehicle 100 includes firmwares capable of rewriting various constant terms which are held in the control unit even when the power-off state, such as various learned values and control constants in response to commands from the inspection tool provided at the line end.

On the other hand, as shown in FIG. 1, the central information control center 151 is connected to a plurality of departments, such as a development headquarter 152, a software development and environment headquarter 153, a sales and service headquarter 154 and an inspection and quality guarantee headquarter 155 via a network 150 as well as to an inspection tool 156b for inspecting the vehicle 100 on a chassis dynamometer 156a installed in the factory production line at a line end 156 thereof. The inspection tool 156b includes a communication adapter for wireless (radio) communication with the communication circuit #01a provided in the control unit of the vehicle 100.

Also, networks 160, 170, . . . for, e.g., dealers in various districts are connected to the network 150. Further, service tools 161, 171, . . . , sales tools 162, 172, . . . , and so on are connected to the corresponding networks 160, 170, . . . , respectively. Thus, a vehicle control system is formed which enables actual diagnosis and repair of the vehicle 100 to be performed based on the control information collected in the central information control center 151. Moreover, the networks 150, 160, 170, . . . are connected to the Internet 180, as a network open to the general public use, so that the information can be provided via a personal computer PC of each user in addition to the cellular phone 110.

In the vehicle control system described above, initial values of control information (i.e., initial information) of each vehicle are collected by using the inspection tool 156b at the line end 156 of the factory production line. The vehicle 100 is then put into the market after analyzing the accumulated initial information of the vehicle 100 to obtain optimum learned values, optimum control constants, and etc. and after setting the obtained data in the control unit of the vehicle 100. After the vehicle 100 has been put into the market, the vehicle information obtained through user access is also accumulated in addition to the initial information. When the vehicle 100 is in an operating state, each user can transmit the vehicle information to the central information control center 151 by radio at any time regardless of whether the vehicle 100 is stopped or running.

More specifically, when each user wants to know the condition of the vehicle 100, the user can receive the information regarding the vehicle maintenance condition, such as the presence or absence of any trouble in the vehicle 100, by transmitting the vehicle information to the central information control center 151 by using the cellular phone 110 for the vehicle 100. In particular, since the data can be transmitted from the running vehicle 100 in real time via wireless communication, it is possible to promptly pursue the cause and take a countermeasure for an abnormality appearing only in the running state and a malfunction of the vehicle 100 appearing with very small reproducibility, which have been difficult to realize the prompt pursuit of the cause in the past.

For transmitting the vehicle information of the vehicle 100 to the central information control center 151, the user is only required to use the cellular phone 110 for the vehicle 100 and to push buttons of the cellular phone 110 to enter a preset particular number. The entry of the preset particular number automatically brings the wireless communication between the control unit #01 of the vehicle 100 and the central information control center 151 into a standby state, and then sets a call to the central information control center 151. Then, upon establishment of a connection between the cellular phone 110 and the central information control center 151, the data collected from the individual control units via the network 101 in the vehicle 100 is transmitted from the communication circuit #01a of the control unit #01 to the cellular phone 110 after being added with the vehicle body number (identification number), and is further transmitted to the central information control center 151 through the cellular phone 110 after being added with the user identification code, etc.

The initial information of each vehicle 100 and the information of the vehicle 100 after being marketed (i.e., the vehicle information for each user), both accumulated in the database DB of the central information control center 151, are distributed via the network 150 to each of the related departments, which are authorized by the database DB, so that the vehicle maintenance condition is managed and various services are provided. Specifically, various control processes, such as a collection of usage frequency of the information of respective parts in the vehicle 100, an evaluation of control algorithms, real-time diagnosis and action against a trouble, predictive diagnosis based on confirmation of changes of the passage of time of the parts and of the learned values, and diagnosis of a trouble that is difficult to reproduce, are performed in the relevant departments, whereas improvements of the control algorithms, collection of the information for technology development, etc. are performed in the other relevant departments.

Further, as a part of user services, the relevant department performs pre-diagnosis of the vehicle 100 before it is sent to a service factory, notifies each user of the time limit in sending the vehicle 100 to the service factory for routine inspections, and distributes the information to the dealer for instruction of the check or the diagnosis operations by using the service tool 161 (171). In addition, the relevant department performs an absolute quality evaluation for a part of the vehicle 100 after being marketed, real-time collections of actual statistic data, relative quality evaluation for each parts maker, etc., and feeds the evaluation results back to the corresponding departments.

The information, such as the data analysis results and the diagnosis results obtained for each vehicle 100, is accumulated in the central information control center 151 in a time sequential manner as a record information for each user. The accumulated information is provided to the individual users via the home page on the Internet 180 or via the cellular phone 110 directly. Each user can read the information of the vehicle 100 by making an access to the corresponding home page via the Internet 180 from the personal computer PC or making a direct access to the central information control center 151 from the cellular phone 110, and then inputting the identification number, name, password, etc. that are registered in advance. As an alternative, the formally registered user may access a host computer 151a of the central information control center 151 via the personal computer PC. In that case, however, the access to the host computer 151a from the users is restricted by a security system such that only the user is allowed to access general information such as the diagnosis results of the vehicle 100.

Control of diagnosis information regarding a power system of the vehicle 100 will be described hereinafter as a practical process of the control of the vehicle 100 by using the above-described vehicle control system. The following description is first made of a power system installed in the vehicle 100, i.e., a structure of an engine and auxiliary units and an electronic control system for controlling the engine, processing the diagnosing process of individual components and associated systems, and processing the information in the central information control center 151 successively.

Figure 3:
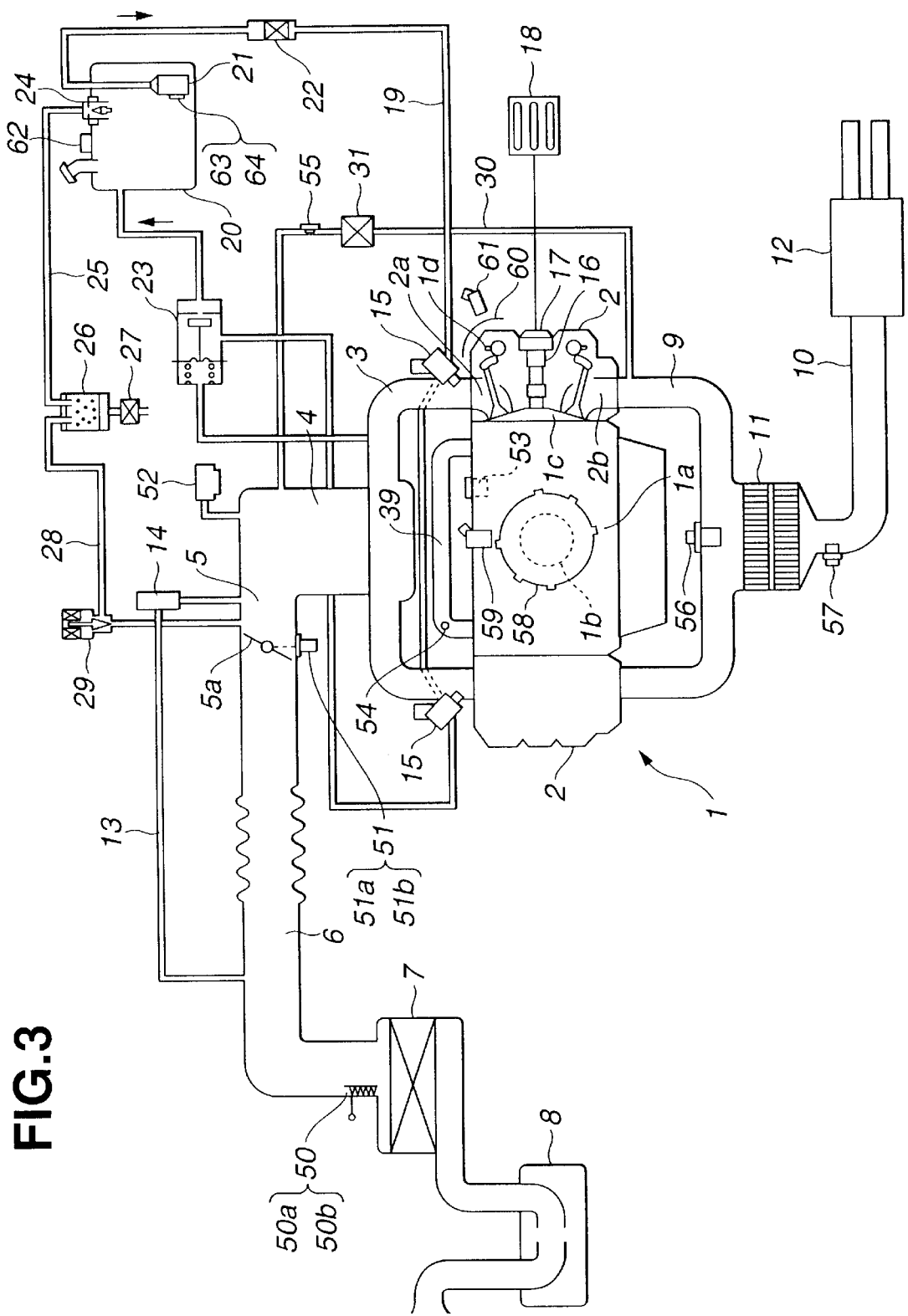
FIG. 3 is an overall schematic view of an engine system.

In this embodiment, as shown in FIG. 3, an engine 1 mounted in the vehicle 100 has a horizontal opposed 4-cylinder engine in which a cylinder block 1a is divided into two banks (left and right banks shown respectively on the right side and the left side as viewed in FIG. 3) on both sides of a crankshaft 1b at the center thereof. Cylinder heads 2 are provided on the left and right banks of the cylinder block 1a of the engine 1, and an intake port 2a and an exhaust port 2b are formed in each of the cylinder heads 2.

An intake manifold 3 is communicated with the intake port 2a, and a throttle chamber 5 is communicated with the intake manifold 3 through an air chamber 4 to which intake passages of respective cylinders are collectively connected. An air cleaner 7 is disposed at an upstream side of the throttle chamber 5 with an air intake duct 6 extended therebetween, and is communicated with an air intake chamber 8. Also, an exhaust manifold 9 is communicated with the exhaust port 2b. The exhaust manifold 9 from the respective banks are joined together and a catalytic converter 11 is interposed in a joined portion and communicated with a muffler 12 via an exhaust pipe 10.

A throttle valve 5a mechanically connected with an accelerator pedal is provided in the throttle chamber 5, and a bypass passage 13 is branched from the air intake duct 6 and extended to the throttle valve 5a. An Idle Speed Control (ISC) valve 14 is interposed in the bypass passage 13 for adjusting an amount of air flowing through the bypass passage 13 and controlling an idling speed in the idle mode. Further, a fuel injector 15 is located in the intake manifold 3 at a position just upstream of the intake port 2a for each cylinder, and a spark plug 16 is attached to the cylinder head 2 for each cylinder such that an electrode formed at an end of the spark plug 16 is exposed to a combustion chamber 1c. An igniter 18 is connected to an ignition coil 17 connected with the spark plug 16.

The fuel injector 15 is communicated with a fuel tank 20 through a fuel supply passage 19, and a fuel pump 21 of an in-tank type is provided in the fuel tank 20. The fuel pump 21 supplies fuel under a pressure to the fuel injectors 15 and a pressure regulator 23 through a fuel filter 22 interposed in the fuel supply passage 19. The pressure regulator 23 regulates the pressure of the fuel supplied to the fuel injectors 15 at a predetermined pressure value, while surplus fuel is returned from the pressure regulator 23 to the fuel tank 20.

At a top portion of the fuel tank 20, a fuel cutoff valve 24 is provided to prevent a fuel leakage if the vehicle 100 is overturned, and to prevent the fuel from flowing into a purge system that serves to purge an evaporating gas generated in the fuel tank 20. A first purge passage 25 for introducing the evaporating gas purged through the fuel cutoff valve 24 is extended from the fuel cutoff valve 24 and communicated with a top portion of a canister 26 that has an adsorption element with an activated coal, for example. A fresh air introducing port is formed in a bottom portion of the canister 26 for communication with the atmosphere through a drain valve 27 function by a solenoid on/off valve operation. A second purge passage 28 for introducing both fresh air from the introducing port and the evaporating gas stored in the adsorption element is extended from the top portion of the canister 26 and then communicated with the intake side (at a position just downstream of the throttle valve 5a) through a Canister Purge Control (CPC) valve 29 that serves to adjust the amount of the purged evaporating gas.

Further, for recirculating exhaust gas from the exhaust pipe to the intake pipe of the engine 1, an Exhaust Gas Recirculation (EGR) passage 30 is extended from the exhaust manifold 9 on the bank and then communicated with the air chamber 4. An EGR valve 31 for adjusting an EGR rate is interposed in the EGR passage 30 so that a portion of the exhaust gas is recirculated to the intake pipe depending on the position (opening degree) of the EGR valve 31.

Outline of a cooling system for the engine 1 will now be described with reference to FIG. 4 hereinafter. Water jackets 32 are formed in the cylinder block 1a of the engine 1 and the cylinder heads 2 provided on the left and right banks, and the delivery side of a pump 34 is connected to a cooling water inlet 33 of the water jackets 32. A thermostat 36 is disposed in a suction side passage 35 of the water pump 34, and the inlet side of the thermostat 36 is connected to a radiator 38 through a cooling water passage 37.

Also, on the side above the engine 1, a joint passage 39 is communicated with the water jackets 32 extended from the respective banks, and a return passage 40 communicating with the radiator 38 is connected to the joint passage 39. Further, connected to the joint passage 39 are a cooling water passage 42 for preheating an intake air through a throttle body 41 that contains the ISC valve 14 and the throttle valve 5a as described above, and a heater 44 through a heater 43. Then, both the passages 42, 44 are joined to a circulation passage 45 that is connected to the passage 35 (outlet side of the thermostat 36) of the pump 34.

When the cooling water (hereinafter, referred to engine coolant) temperature is at a low level, the thermostat 36 is closed, causing the engine coolant to flow through the passages 42, 44 and the circulation passage 45. When the coolant temperature rises, the thermostat 36 is opened, causing the engine coolant to flow, in addition to the above circulation, through a down-flow type system in which the engine coolant cooled by the radiator 38 is delivered from the side under the engine 1 to the water jackets 32 for the engine 1 by the water pump 34 and the engine coolant having been subjected to a heat exchange in the water jackets 32 is returned from the side above the engine 1 to the radiator 38.

Moreover, the radiator 38 is connected to a reserve tank 46 for storing the engine coolant overflowed from the radiator 38. A condenser 47 for an air conditioner is disposed in front of the radiator 38, and a motor-driven radiator fan 48 is disposed behind the radiator 38 for cooling the radiator 38 and the condenser 47 with forcibly introduced air.

A description is now made of sensors for detecting the engine operating status. As shown in FIG. 3, at a position in the air intake duct 6 just downstream of the air cleaner 7, an intake air amount and intake air temperature measuring unit 50 is disposed which incorporates, as an integral unit, an air flow sensor 50a for measuring the amount of the intake air and an intake air temperature sensor 50b for measuring the temperature of the intake air. Also, a throttle sensor 51 incorporating a throttle position sensor 51a and an idle switch 51b, which is turned on upon the throttle valve 5a coming into a fully closed state, is associated with the throttle valve 5a disposed in the throttle chamber 5. An intake manifold pressure sensor 52 for detecting the pressure in the intake pipe at a position downstream of the throttle valve 5a is attached to the air chamber 4.

Figure 4:
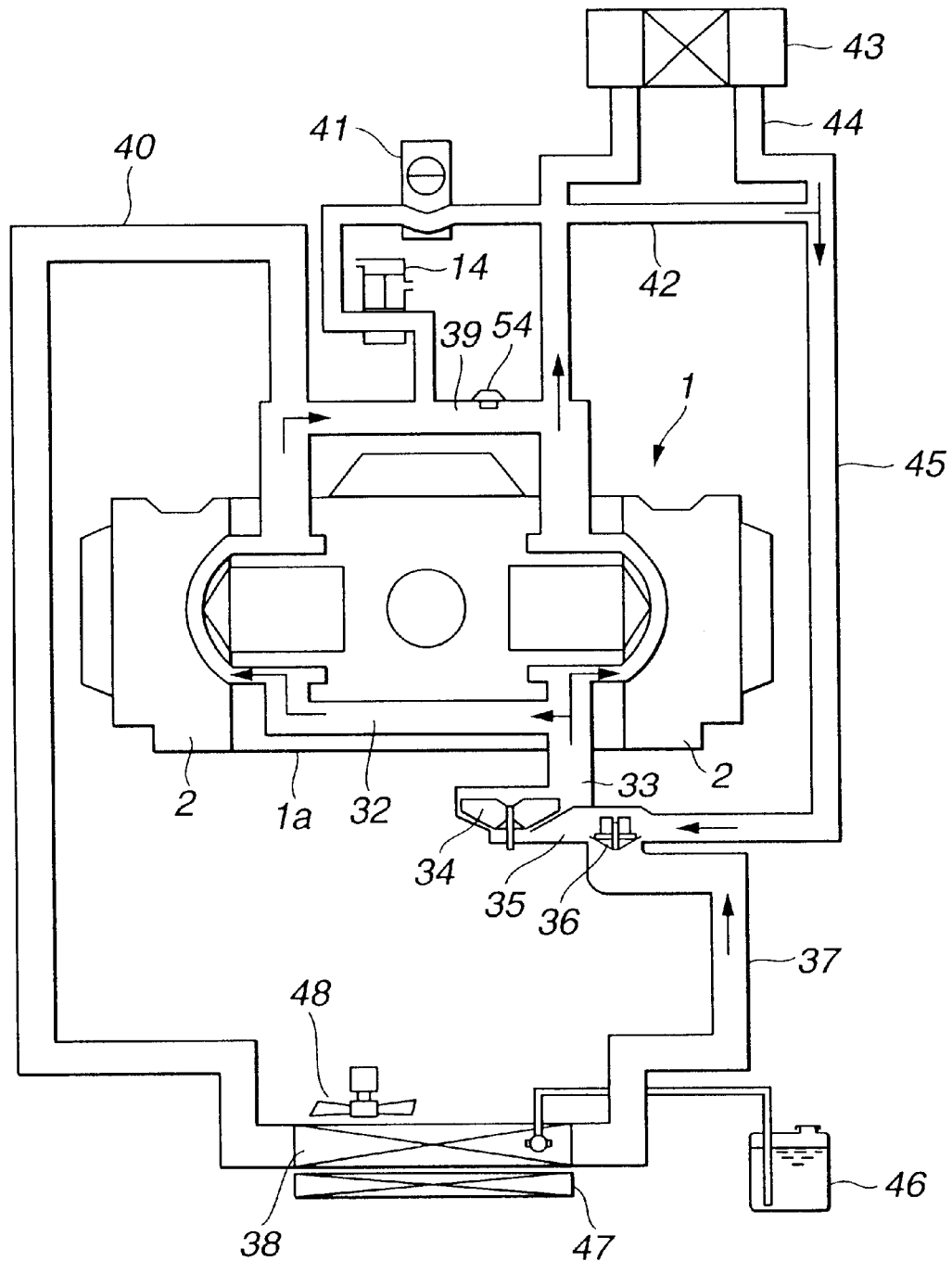
FIG. 4 is a schematic view of an engine cooling system.

Further, a knock sensor 53 is attached to the cylinder block 1a of the engine 1, and a coolant temperature sensor 54 is located in the joint passage 39 communicating the left and right banks of the cylinder block 1a with each other (see FIG. 4). An EGR gas temperature sensor 55 for detecting the temperature of the EGR gas is located in the EGR passage 30. A front Air/Fuel (A/F) sensor 56 is disposed upstream of the catalytic converter 11, and a rear A/F (air and fuel ratio) sensor 57 is disposed at the downstream side of the catalytic converter 11.

In addition, a crank angle sensor 59 is disposed to face an outer periphery of a crank rotor 58 mounted on the crankshaft 1b of the engine 1. A cam angle sensor 61 for determining which cylinder is currently in the combustion stroke, which cylinder is currently under fuel injection, and which cylinder is currently under ignition, is disposed to face a cam rotor 60 associated with a cam shaft 1d that is rotated ½ revolution with respect to the crankshaft 1b. On the other hand, at the top portion of the fuel tank 20, a pressure sensor 62 is disposed for detecting the pressure in the purge system. A fuel level sensor 63 for detecting the fuel level and a fuel temperature sensor 64 for detecting the fuel temperature are provided integrally with the fuel pump 21 in the fuel tank 20.

Figure 5:
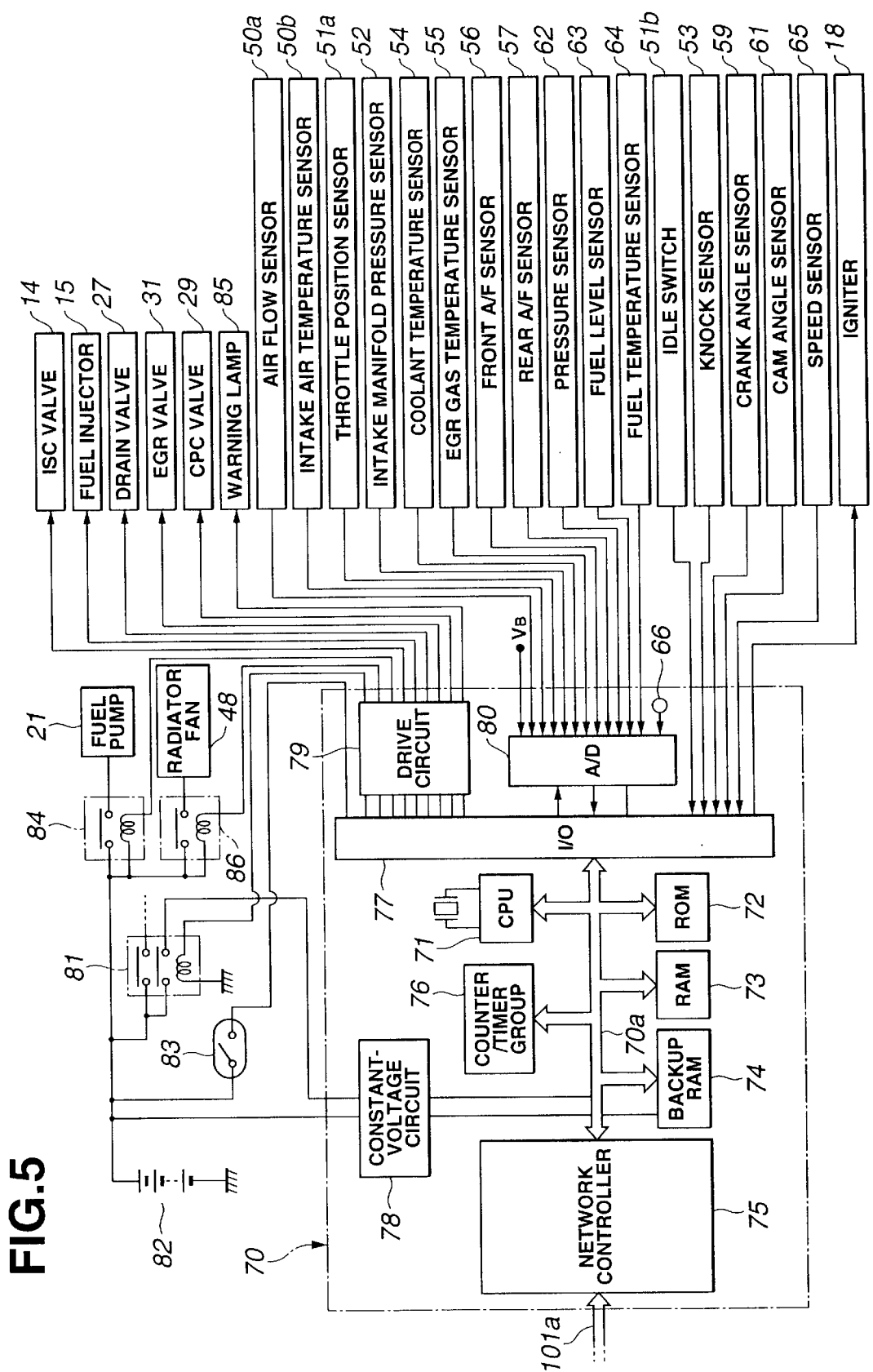
FIG. 5 is a circuit diagram of an engine electronic control system.

The above-described actuators, sensors and switches provided in the engine system are connected to an Engine Control Unit (ECU) 70 shown in FIG. 5. The ECU 70 corresponds to one, e.g., #02, of the control units #01, #02, #03, #04, #05, . . . constituting the network 101 of the vehicle 100, and is primarily structured of a microcomputer. A CPU 71, a ROM 72, a RAM 73, a backup RAM 74, a network controller 75 for the on-board network, a counter/timer group 76, and an I/O (Input/Output) interface 77 are interconnected via an internal bus 70a and also connected from the network controller 75 to the other on-board control units via an external bus 101a.

The ROM 72 includes a mask ROM on which data is written with a photo mask in the manufacturing stage, and an EEP (Electrically Erasable Programmable) ROM on which data can be electrically rewritten; e.g., a flash ROM on which data can be erased at a time and rewritten with ease in an onboard state. The mask ROM stores a program for communication via the network controller 75, a program for writing programs, constants, etc. in the EEPROM via communication with an external device, and so on. The EEPROM does not store any significant data in the initial production stage. In the stage of assembling the ECU 70 in the vehicle 100, engine control programs for a fuel injection control, an ignition timing control, etc. and data depending on the model of the vehicle 100, such as control constants, are written on the EEPROM through the inspection tool 156b provided at the line end 156.

The counter/timer group 76 collectively implies various counters, such as a free run counter and a counter for receiving and counting the cam angle sensor signal (cylinder number determining pulse), and various timers, such as a fuel injection timer, an ignition timer, a periodic interrupt timer for causing a periodic interrupt, a timer for measuring an input interval of a crank angle sensor signal (crank pulse), and a watchdog timer for monitoring a system abnormality. In addition to the above examples, various software counters and timers are also used.

The ECU 70 incorporates auxiliary circuits, such as a constant voltage circuit 78 for supplying stabilized power to the related sections, and a drive circuit 79 and an A/D (Analog/Digital) converter 80 that are connected to the I/O interface 77. The constant voltage circuit 78 is connected to a battery 82 through a first relay contact of a power supply relay 81 having two-circuit relay contacts, and is also directly connected to the battery 82. When an ignition switch 83 is turned on and the contact of the power supply relay 81 is closed, the power is supplied to the related sections in the ECU 70. On the other hand, the backup power is supplied to the backup RAM 74 at all times regardless of whether the ignition switch 83 is turned on or off. Further, the fuel pump 21 is connected to the battery 82 through a relay contact of a fuel pump relay 84, and the motor-driven radiator fan 48 is connected to the battery 82 through a relay contact of a radiator fan relay 86. In addition, a power supply line for supplying power to the various actuators from the battery 82 is connected to a second relay contact of the power supply relay 81.

The ignition switch 83, the idle switch 51b, the knock sensor 53, the crank angle sensor 59, the cam angle sensor 61, a speed sensor 65, etc. are connected to input ports of the I/O interface 77. Further, through the A/D converter 80 other input terminals of the I/O interface 77 are connected to the air flow sensor 50a, the intake air temperature sensor 50b, the throttle position sensor 51a, the intake manifold pressure sensor 52, the coolant temperature sensor 54, the EGR gas temperature sensor 55, the front A/F sensor 56, the rear A/F sensor 57, the pressure sensor 62, the fuel level sensor 63, the fuel temperature sensor 64, and an atmospheric pressure sensor 66 incorporated in the ECU 70, etc. A battery voltage VB is also inputted to the I/O interface 77 for monitoring.

On the other hand, through the drive circuit 79 output ports of the I/O interface 77 are connected to a relay coil of the power supply relay 81, a relay coil of the fuel pump relay 84, a relay coil of the radiator fan relay 86, the ISC valve 14, the fuel injector 15, the drain valve 27, the CPC valve 29, the EGR valve 31, and a warning lamp 85 for notifying the occurrence of any abnormality, etc. Further, the igniter 18 is connected to another output port of the I/O interface 77.

In the ECU 70, the CPU 71 executes the control program stored in the ROM 72 to process detection signals from the various sensors and switches, the battery voltage VB, etc. inputted through the I/O interface 77. The fuel injection volume, the ignition timing and control variables of the actuators, etc. are computed based on various data stored in the RAM 73, on various learned value data stored in the backup RAM 74 and on fixed data stored in the ROM 72, etc., thereby performing the engine control such as A/F ratio control (fuel injection control), ignition timing control, idle rotational speed control, evaporating fuel purge control, EGR control, radiator fan control, etc.

Simultaneously, the ECU 70 monitors the presence or absence of abnormality in the power system with the self-diagnosing function. If any abnormality is detected, the warning lamp 85 is lit up or blinked, and trouble data are stored in the backup RAM 74. In this connection, when the diagnosis result is determined as indicating not only an abnormal state, but also a state close to the trouble level even if it is within the normal range, the parameters representing the operating status and the control status, primarily the parameters related to the diagnosis target, are stored in the backup RAM 74 during the diagnosis or before and after the diagnosis in addition to the parameters used in the diagnosis. The parameters are transmitted from the network 101 of the vehicle 100 to the central information management center 151 through the cellular phone 110.

Processing for the diagnosis and diagnosis information executed on the power system with the self-diagnosing function of the ECU 70 will be described below, taking as examples actuator functional diagnosis, sensor functional diagnosis, disconnection/short-circuit diagnosis of a wiring system including the input/output units such as various actuators, sensors, etc., cooling system diagnosis, fuel system diagnosis, catalyst degradation diagnosis, purge system diagnosis, EGR system diagnosis, and misfire diagnosis of the engine ignition system.

Figure 6:
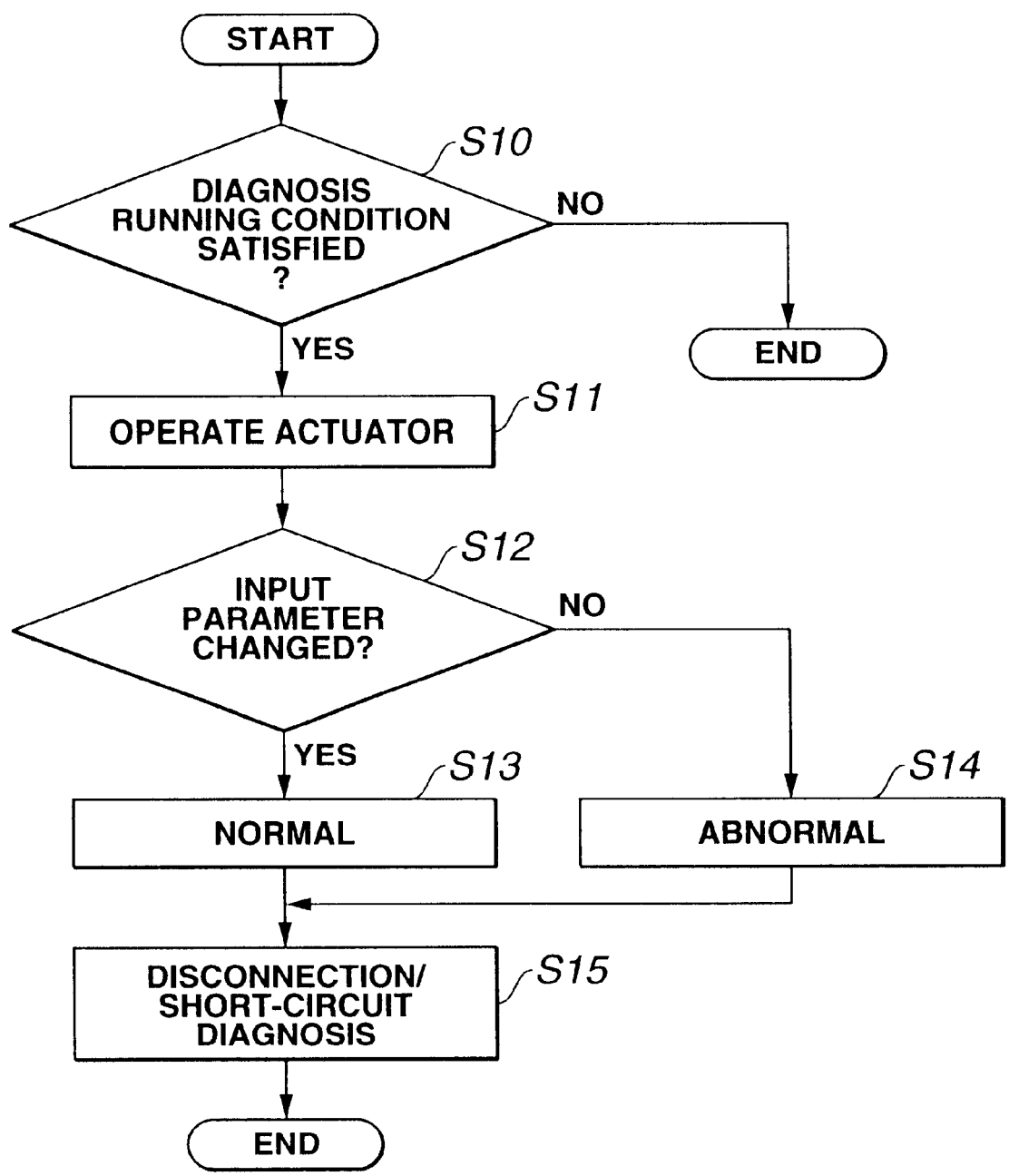
FIG. 6 is a flowchart of an actuator functional diagnosis routine on the vehicle.

A routine shown FIG. 6 is a flow chart for the actuator functional diagnosis. First, the ECU checks in step S10 whether a diagnosis running condition is satisfied. If the diagnosis running condition is not satisfied, the ECU exits the routine at once, and if the diagnosis running condition is satisfied, it proceeds to step S11 for executing the diagnosis.

In step S11, a signal for driving an actuator as a diagnosis target is outputted. In step S12, the ECU checks whether there are predetermined changes in input parameters for the diagnosis, the input parameters for the diagnosis being given by input values of, e.g., operating status parameters and control parameters that are changed with operation of the actuator.

Then, if there are predetermined changes in the input parameters for the diagnosis, it is determined in step S13 that the actuator as the diagnosis target is normal as detailed in diagnosis examples (1) to (8) explained below. If there are no predetermined changes in the input parameters for the diagnosis, it is determined in step S14 that the actuator as the diagnosis target is abnormal. Note that, in all of the diagnosis examples (1) to (8) explained below, a final abnormality determination is made when an abnormal state has continued over a predetermined time or over a predetermined number of rotations.

(1) Functional Diagnosis of Drain Valve 27 in Evaporating Fuel Purge System

After the end of leak diagnosis that is performed by sealing off a negative pressure in a closed system formed by the purge system, the drain valve 27 associated with the canister 26 is switched from the closed state to the open state, and the pressure in the purge system detected at that moment by the pressure sensor 62 is used as the input parameter for the diagnosis. If a change of the pressure in the purge system is not larger than a setted value, this is determined as an indication of the fact that the drain valve 27 is seized in the closed state and the atmosphere is not introduced to the purge system through the fresh air introducing port of the canister 26. It is hence determined that the drain valve 27 is in an abnormal state in which it is seized or clogged at the closed position.

(2) Functional Diagnosis of CPC Valve 29 in Purge System

When the purge system is brought into a closed system before introducing a negative pressure into the purge system and before starting the leak diagnosis, the pressure in the purge system is detected by the pressure sensor 62 and the detected pressure is used as the input parameter for the diagnosis. If a change of the pressure in the purge system occurs in the negative direction and is not smaller than a setted value, it is determined as indicating the fact that, in spite of the CPC valve 29 being under control to make it closed, the CPC valve 29 is seized in the open state and the negative pressure in the intake pipe is introduced into the purge system. It is hence determined that the CPC valve 29 is in an abnormal state in which it is seized at the open position.

(3) Functional Diagnosis of Heater for Front A/F Sensor 56 (Heater for Rear A/F Sensor 57)

An energization control signal, e.g., a duty control signal, is outputted to a relevant heater for bringing the heater into an energized state. An impedance of a sensor is measured and the detected impedance is used as the input parameter for the diagnosis. If the impedance of the sensor is larger than the setted value in spite of the duty ratio being larger than the setted value (i.e., in spite of supplying a relatively larger electric current), this is determined as indicating an abnormal state, for example, a degradation of the sensor or a disconnection of the heater.

(4) Functional Diagnosis of ISC Valve 14

An opening degree of the ISC valve 14 is decided in an idle operating condition so that the engine speed is controlled to a target value. The engine speed detected during such a control is used as an input parameter for the diagnosis. If the engine speed is not settled within a setted value range with respect to the target engine speed in spite of aiming at the target engine speed, the ISC valve 14 is determined as being in the abnormal state.

(5) Functional Diagnosis for Operation of Radiator Fan 48

After changing the radiator fan 48 from an off-operation stage to an on-operation stage in the idle operating condition, the coolant temperature is measured and used as an input parameter for the diagnosis. If the coolant temperature is not lowered, the radiator fan 48 is determined as being in the abnormal state.

(6) Functional Diagnosis of Boost Pressure Control Valve (for the Engine with Supercharger or Turbocharger)

When in the control status where a control variable, e.g., a duty ratio of a duty control signal, for a boost pressure valve is not larger than the setted value and a boost pressure should be relatively low, the boost pressure is measured and used as the input parameter for the diagnosis. If the measured boost pressure is not lower than the setted value, the boost pressure valve is determined as being in the abnormal state.

(7) Functional Diagnosis of Power-Operated Throttle (for the Engine of Electronic Control Throttle Type)

When controlling the opening degree (position) of a power-operated throttle, the actual throttle opening degree is detected by the sensor, for example, and is used as the input parameter for the diagnosis. If the difference between the target throttle opening degree and the actual throttle opening degree is not smaller than a setted value, the power-operated throttle is determined as being in the abnormal state.

(8) Functional Diagnosis of Variable Valve Timing Control Valve (for the Engine with Variable Valve Timing Mechanism)

While controlling with a variable valve timing mechanism, the actual valve timing is detected by the sensor, for example, and is used as the input parameter for the diagnosis. If the difference between the target valve timing and the actual valve timing is not smaller than the setted value, a variable valve timing control valve is determined as being in the abnormal state.

After the completion of the above-mentioned diagnosis, the process flow goes to step S15 in which it is diagnosed whether there is a disconnection/short-circuit as the cause of the abnormality that has not been detected or has been detected by the above-mentioned diagnosis with the actuator operation. The diagnosis for the disconnection/short-circuit is executed by using a disconnection/short-circuit diagnosis routine (described later) shown in FIG. 10. Basically, the diagnosis for the disconnection/short-circuit is executed by checking whether an output value to the actuator under the diagnosis is too small or large beyond the range specified in specifications. Finally, if the actuator itself under the diagnosis or any associated (accompanied) system is determined as being in the abnormal state, the warning lamp 85 is lit up or blinked for issuing the alarm to the driver. This diagnosis process is thereby brought into an end.

Figure 7:
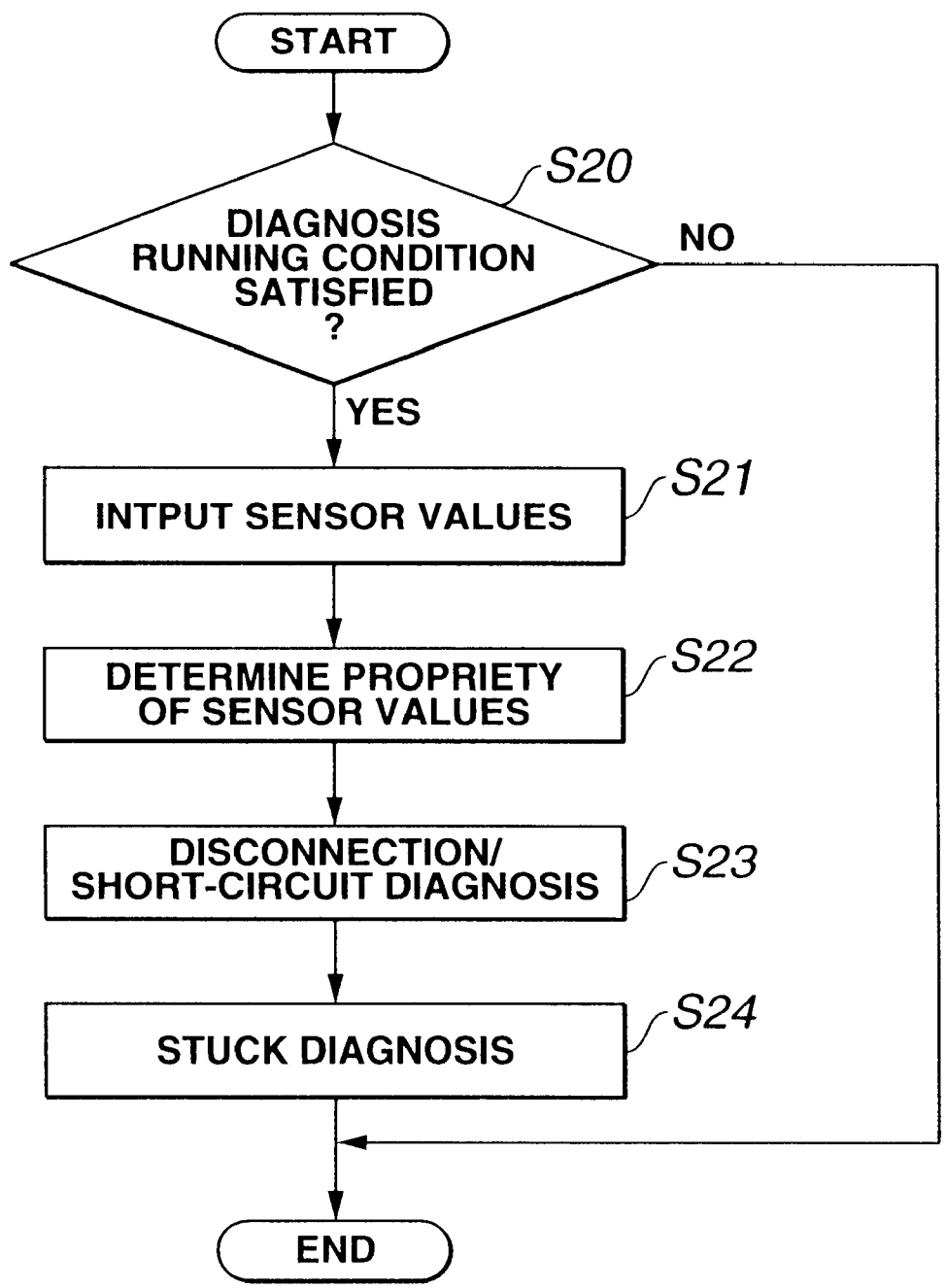
FIG. 7 is the flowchart of a sensor functional diagnosis routine on the vehicle.

Next, the sensor functional diagnosis is executed by using a routine shown in FIG. 7. In the routine of FIG. 7, the ECU first checks in step S20 whether a diagnosis running condition is satisfied. If the diagnosis running condition is not satisfied, the ECU exits the routine at once, and if the diagnosis running condition is satisfied, it proceeds to step S21 for execution of the diagnosis.

In step S21, sensor values are inputted from the sensor as a diagnosis target. Then, a propriety (rationality) of the sensor values inputted from the sensor as the diagnosis target is determined in step S22. The propriety of the sensor value inputted from the sensor as the diagnosis target is determined in accordance with diagnosis algorithms (A) and (B) given below.

(A) For the sensor having similar functions, the propriety is determined by checking a coordination between respective output values or output timings.

(B) Alternatively, the propriety is determined by using a detected parameter of the sensor as a diagnosis target and other related parameters (such as sensor values from the other sensors, control parameters, and operating status parameters), and estimating a range of the value that can be taken by the sensor as a diagnosis target.

Practical diagnosis examples (10) to (21) of the various sensors will be described below. Note that, in all diagnosis examples (10) to (21), a final abnormality determination is made when the abnormal state has continued over a predetermined time or over a predetermined number of rotations.

(10) Propriety Diagnosis of A/F Sensor

An output result of the front A/F sensor 56 at the upstream side of the catalytic converter 11 is compared with an output result of the rear A/F sensor 57 at the downstream side of the catalytic converter 11. If a condition in which both the output results differ from each other in rich/lean state continues over a setted time, it is determined that at least one of the A/F sensors is in the abnormal state.

(11) Propriety Diagnosis of Crank Angle Sensor 59 and Cam Angle Sensor 61

Based on a signal pattern provided by a pulse signal corresponding to a crank angle outputted from the crank angle sensor 59 and a pulse signal for a cylinder number determination signal outputted from the cam angle sensor 61 between the crank angle pulse signals, if an output pulse of the cam angle sensor 61 is not inputted at the specified timing with respect to an output pulse of the crank angle sensor 59, it is determined that at least one of the crank angle sensor 59 and the cam angle sensor 61 is in the abnormal state.

(12) Propriety Diagnosis of Intake Manifold Pressure Sensor 52

When the engine speed is increased from 0 to a level over the setted value at an engine startup, a change of the pressure indicated by intake manifold pressure sensor 52 is measured. If the pressure change is not larger than the predetermined threshold value and the intake manifold pressure corresponding to an engine speed increase is not detected, the intake manifold pressure sensor 52 is determined as being in the abnormal state.

(13) Propriety Diagnosis of Intake Air Temperature Sensor 50*b*

When a period of time over a setted time has lapsed after the engine startup and the coolant temperature has risen over the setted value from the coolant temperature at the engine startup, the current intake air temperature indicated by temperature sensor 50*b* is compared with the intake air temperature at the engine startup. If the difference between both the temperatures is not larger than the predetermined threshold value and a rise of the intake air temperature corresponding to an increase of the engine temperature (coolant temperature) is not detected, the intake air temperature sensor 50b is determined as being in the abnormal state.

(14) Propriety Diagnosis of Coolant Temperature Sensor 54

The coolant temperature is estimated from an engine-generating heat value calculated from both the engine speed and the engine load and an engine-radiating heat value calculated on the basis of both the vehicle speed and the open air temperature, and is compared with the coolant temperature indicated by the coolant temperature sensor 54. If the difference between both the temperatures is not smaller than the predetermined threshold value, the coolant temperature sensor 54 is determined as being in the abnormal state.

(15) Propriety Diagnosis of Throttle Position Sensor 51a

The throttle opening degree is estimated from the intake manifold pressure (or the intake air amount) and the engine speed, and is compared with the throttle opening degree indicated by the throttle position sensor 51a. If the difference between both the throttle opening degrees is not larger than the predetermined threshold value and the throttle opening degrees corresponding to the engine operating status is not detected, the throttle position sensor 51a is determined as being in the abnormal state.

(16) Propriety Diagnosis of Fuel Level Sensor 63

The fuel consumption is estimated from an accumulated value of the intake air amount, etc. If the amount of change in fuel level indicated by the fuel level sensor 63 relative to the estimated fuel consumption is not larger than a predetermined threshold value and is not corresponding to the estimated fuel consumption, the fuel level sensor 63 is determined as being in the abnormal state.

If the output value of the fuel level sensor 63 repeats variations in a predetermined time at the vehicle speed of 0 km/h, the fuel level sensor 63 is determined as being in the abnormal state.

(17) Propriety Diagnosis of Fuel Temperature Sensor 64

When the coolant temperature has risen over a predetermined value, the resulting coolant temperature is compared with the fuel temperature indicated by the fuel temperature sensor 64. If the difference between both the temperatures is not smaller than the predetermined threshold value and the fuel temperature indicates a high level in excess of the rise of the coolant temperature, the fuel temperature sensor 64 is determined as being in the abnormal state.

The fuel consumption is estimated from an accumulated value of the intake air amount, etc. If the amount of change in fuel temperature indicated by the fuel temperature sensor 64 relative to the estimated fuel consumption is not larger than the predetermined threshold value and a rise of the fuel temperature corresponding to a reduction of the fuel amount is not detected, the fuel temperature sensor 64 is determined as being in the abnormal state.

(18) Propriety Diagnosis of Speed Sensor 65

In a condition in which the fuel cutoff mode continues over a predetermined time during deceleration, if the vehicle speed indicated by the speed sensor 65 is not lower than the predetermined threshold value and a reduction of the speed is not detected, the speed sensor 65 is determined as being in the abnormal state.

In a condition in which the engine speed is not lower than a predetermined threshold value and the fuel cutoff mode continues over a predetermined time, if an output value of the speed sensor 65 indicates the vehicle speed of 0 and represents a stopped state in spite of the vehicle being under coasting, the speed sensor 65 is determined as being in the abnormal state.

(19) Propriety Diagnosis of Atmospheric Pressure Sensor 66

During a period of time in which the engine speed increases from 0 to a setted value, if the difference between the intake manifold pressure and the atmospheric pressure indicated by the atmospheric pressure sensor 66 is always kept not larger than the predetermined threshold value, the atmospheric pressure sensor 66 is determined as being in the abnormal state.

(20) Propriety Diagnosis of Air Flow Sensor 50a

In a condition in which the intake manifold pressure and the engine speed are within respective predetermined ranges, if the intake air amount indicated by the air flow sensor 50a is outside a predetermined range and is not corresponding to the range of intake air amount estimated from both the intake manifold pressure and the engine speed, the air flow sensor 50a is determined as being in the abnormal state.

(21) Propriety Diagnosis of Exhaust Gas Temperature Sensor (in Vehicle Including Exhaust Gas Temperature Sensor)

In a condition in which the operation continues under a predetermined load or more, if the exhaust gas temperature indicated by the exhaust gas temperature sensor is not larger than the predetermined threshold value and a rise of the exhaust gas temperature is not detected, the exhaust gas temperature sensor is determined as being in the abnormal state.

After the completion of the above-mentioned propriety diagnosis, the process flow goes to step S23 in which it is diagnosed whether, in the sensor system under the diagnosis, there is the disconnection/short-circuit as the cause of the abnormality that has not been detected or has been detected by the above-mentioned propriety diagnosis. The diagnosis for the disconnection/short-circuit is executed by using a disconnection/short-circuit diagnosis routine (described later) shown in FIG. 10. Basically, the diagnosis for the disconnection/short-circuit is executed by checking whether the input value from the sensor under the diagnosis is too small or too large beyond the range specified in the specifications. Then, stack diagnosis for checking the occurrence of the so-called stack phenomena, i.e., a condition in which the output value of the sensor is held at the predetermined value and remains there, is performed in step S24. Finally, if the sensor under the diagnosis or any associated system is determined as being in the abnormal state, the warning lamp 85 is lit up or blinked for issuing the alarm to the driver. The diagnosis process is thereby brought into an end.

In addition to the sensor functional diagnosis described above, particularly when the front A/F sensor 56 is a wide-range A/F sensor capable of continuously detecting the A/F ratio over a wide range from the rich to lean side including the stoichiometric A/F ratio and the rear A/F sensor 57 is an $O_2$ sensor for detecting the A/F ratio from the concentration of oxygen in the exhaust gas, the diagnosis for the respective responses of the front A/F sensor 56 and the rear A/F sensor 57 is also executed.

Figure 8:
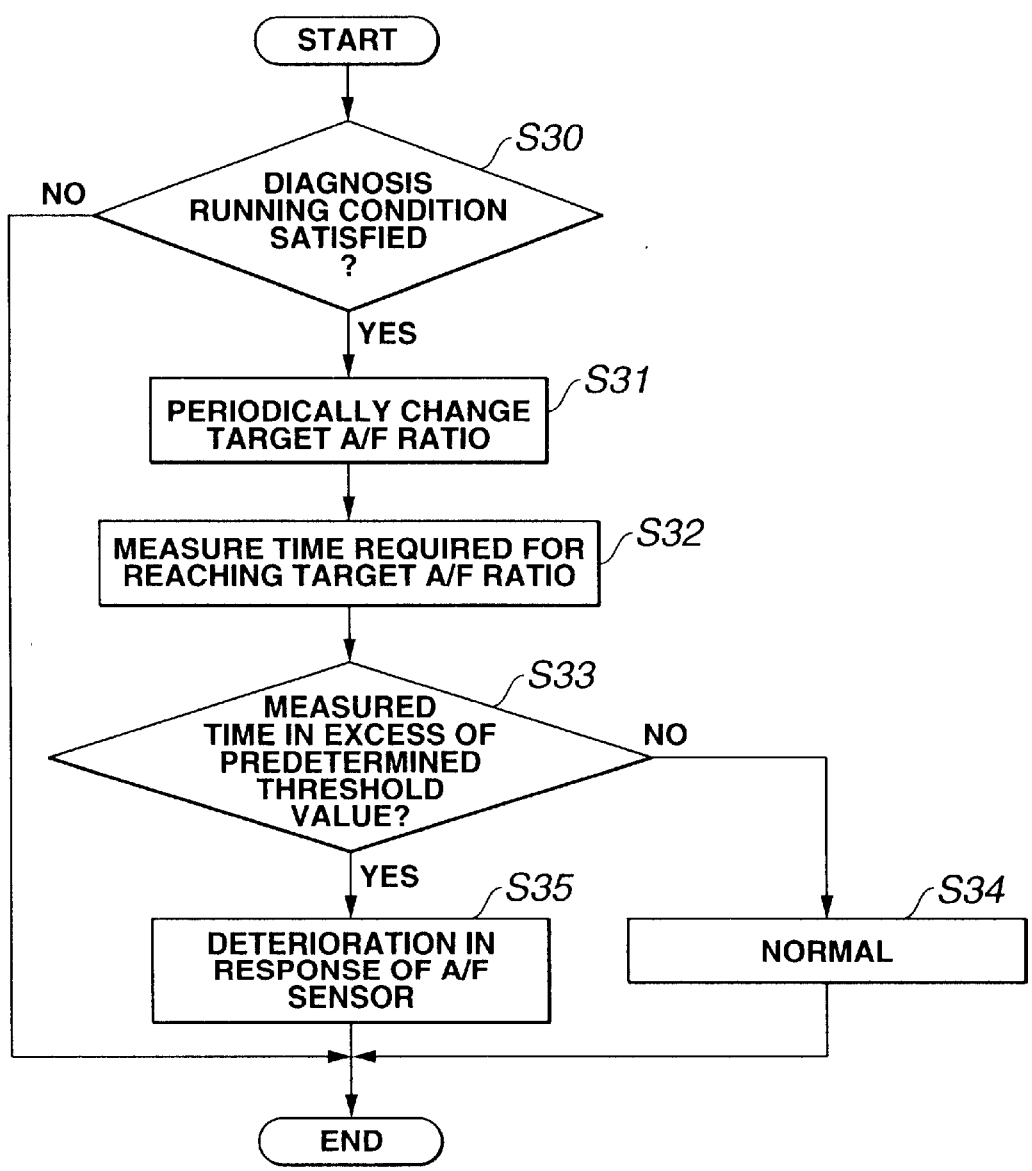
FIG. 8 is the flowchart of a front A/F sensor response diagnosis routine on the vehicle.

A description is first made of the diagnosis of the front A/F sensor 56 as a wide-range A/F sensor. In a front-A/F-sensor response diagnosis routine shown in FIG. 8, the ECU checks in step S30 whether a diagnosis running condition is satisfied. If the diagnosis run (executing) condition is not satisfied, the ECU exits the routine at once, and if the diagnosis running condition is satisfied, it proceeds to step S31 for the execution of the diagnosis.

In step S31, the target A/F ratio is changed. For checking the response of the A/F sensor, the target A/F ratio is changed at a predetermined period. After changing the target A/F ratio to the predetermined value, the ECU proceeds to step S32 in which a time required for the output value of the front A/F sensor 56 to reach the value corresponding to the target A/F ratio is measured.

Then, it is checked in step S33 whether the time until reaching the target A/F ratio exceeds the predetermined threshold value. If the time until reaching the target A/F ratio does not exceed the predetermined threshold value, the ECU determines at the step S34 that the front A/F sensor 56 is normal, and thereafter exits the routine. If the time until reaching the target A/F ratio exceeds the predetermined threshold value, the ECU determines in step S35 that the response of the front A/F sensor 56 is deteriorated and the front A/F sensor 56 is in the abnormal state, and thereafter exits the routine.

Figure 9:
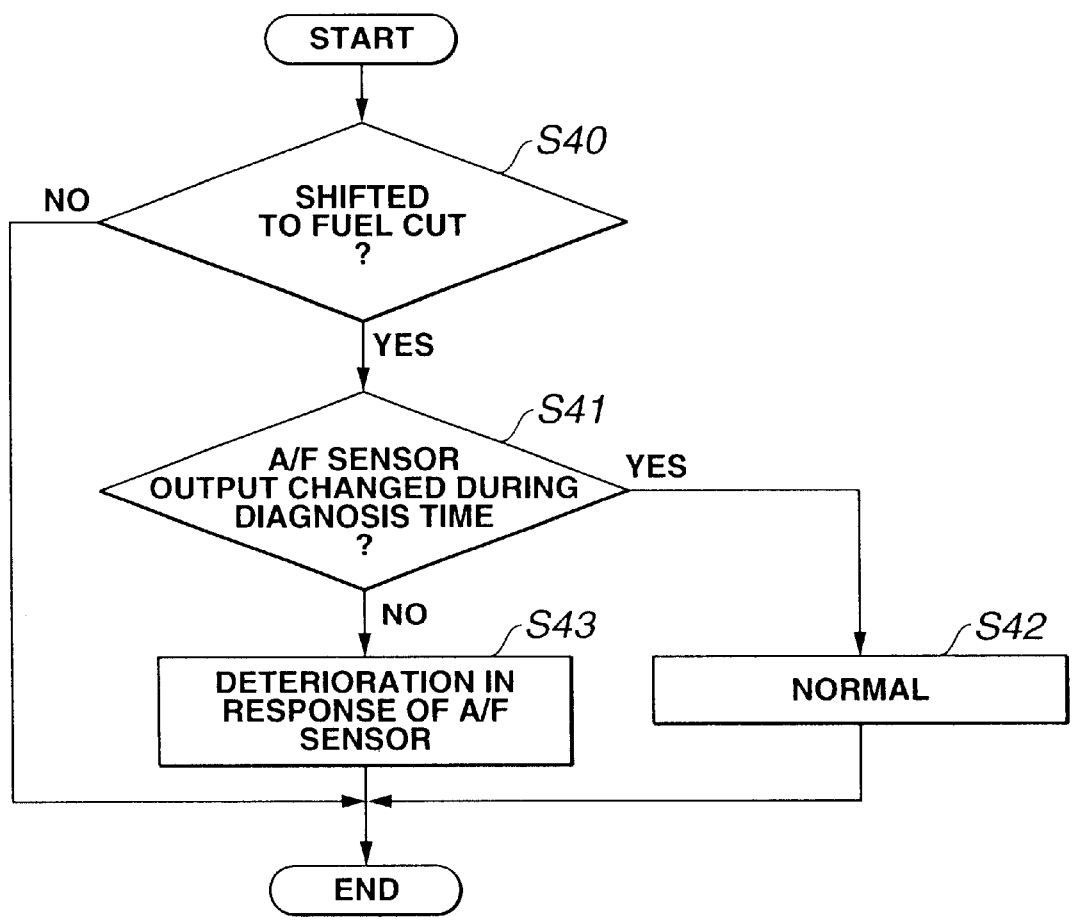
FIG. 9 is the flowchart of a rear A/F sensor response diagnosis routine on the vehicle.

On the other hand, the diagnosis of the rear A/F sensor 57 as an $O_2$ sensor is executed by using a rear-A/F-sensor response diagnosis routine shown in FIG. 9. In the diagnosis routine, the ECU first checks in step S40 whether a diagnosis running condition is satisfied, i.e., whether the fueling mode is shifted from the fuel injection to the fuel cutoff. If the mode is not shifted to the fuel cutoff, the ECU exits the routine at once without executing the diagnosis, and if the fueling mode is shifted to the fuel cutoff, it proceeds to step S41 for executing the diagnosis. Specifically, after the mode shift from the fuel injection to the fuel cutoff, it is checked whether an output of the rear A/F sensor 57 has reversed relative to a reference level within the diagnosis time.

If the output of the rear A/F sensor 57 has reversed within the diagnosis time, the ECU proceeds from step S41 to S42 in which the rear A/F sensor 57 is determined as being normal. Thereafter, the ECU exits the routine. If the output of the rear A/F sensor 57 has not reversed within the diagnosis time, the ECU proceeds from step S41 to S43 in which it is determined that the response of the rear A/F sensor 57 is deteriorated and the rear A/F sensor 57 is in the abnormal state. Thereafter, the ECU exits the routine. Finally, if at least one of the front A/F sensor 56 and the rear A/F sensor 57 is determined as being in the abnormal state, the warning lamp 85 is lit up or blinked for issuing the alarm to the driver.

The disconnection/short-circuit diagnosis of a wiring system including the input/output units such as various actuators, sensors, etc. will be described below with reference to FIG. 10.

Figure 10:
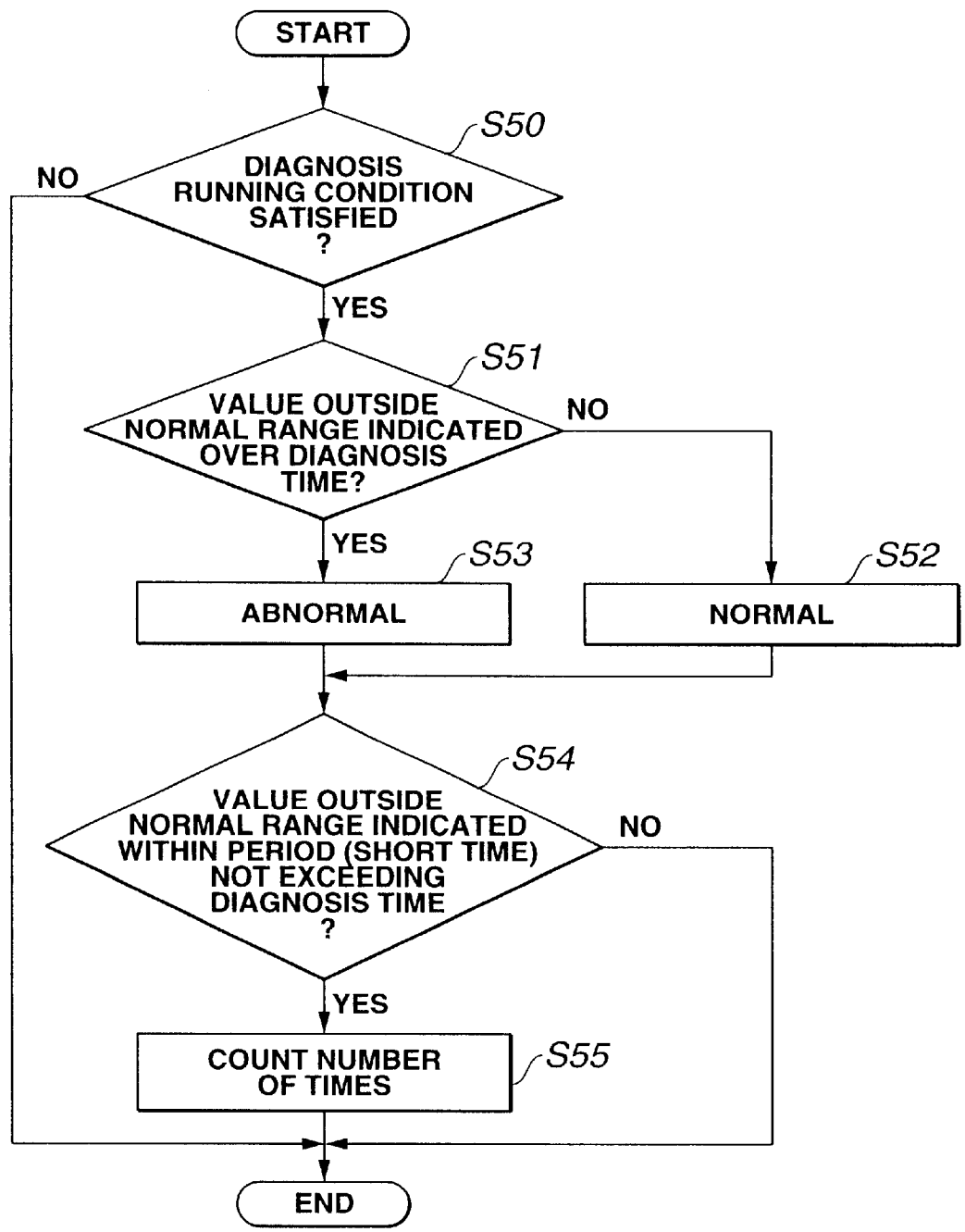
FIG. 10 is a flowchart of a disconnection/short-circuit diagnosis routine on the vehicle.

In a disconnection/short-circuit diagnosis routine shown in FIG. 10, the ECU first checks in step S50 whether diagnosis running condition is satisfied. If the diagnosis running condition is not satisfied, the ECU exits the routine at once, and if the diagnosis running condition is satisfied, it proceeds to step S51 for executing the diagnosis.

In step S51, whether an input value to the diagnosis target (wiring system including the sensor or wiring system including the actuator) or an output value from the diagnosis target continuously indicates a too small or too large value that is never taken in the normal condition, i.e., a value beyond the range specified in specifications, is determined by checking a signal level at a corresponding input or output port of the I/O interface 77 during the diagnosis time that is set in consideration of effects of noise, etc.

If the input/output value to or from the diagnosis target is in the normal range, or if it is temporarily deviated from the normal range, but does not continue over the diagnosis time, the ECU determines in step S52 that the wiring system for the diagnosis target is normal, and thereafter proceeds to step S54. If the input/output value to the diagnosis target continuously indicates, over the diagnosis time, a value that is never taken in the normal condition, the ECU determines in step S53 that the wiring system for the diagnosis target is in the abnormal state of the disconnection/short-circuit, and thereafter proceeds to step S54.

In step S54, whether the input value to the diagnosis target or the output value from the diagnosis target indicates, in a short time not exceeding the diagnosis time, the value that is never taken in the normal condition, is determined by checking changes of the signal level at a corresponding input or output port of the I/O interface 77 within the diagnosis time. Stated otherwise, the ECU checks the condition in which the signal level intermittently reaches the trouble determination level due to, e.g., a contact failure of a connector, but the abnormality determination is not resulted because the duration time is short.

If the input/output value to or from the diagnosis target is kept in the normal range within the diagnosis time, the ECU exits the routine. If the input/output value to the diagnosis target indicates, in a short time not exceeding the diagnosis time, the value that is never taken in the normal condition, the ECU proceeds to step S55 in which the number of times of such a deviation is counted. Finally, if the wiring system for the diagnosis target is determined as containing the disconnection/short-circuit, the warning lamp 85 is lit up or blinked for issuing the alarm to the driver. The diagnosis process is thereby brought into an end.

Figure 11:
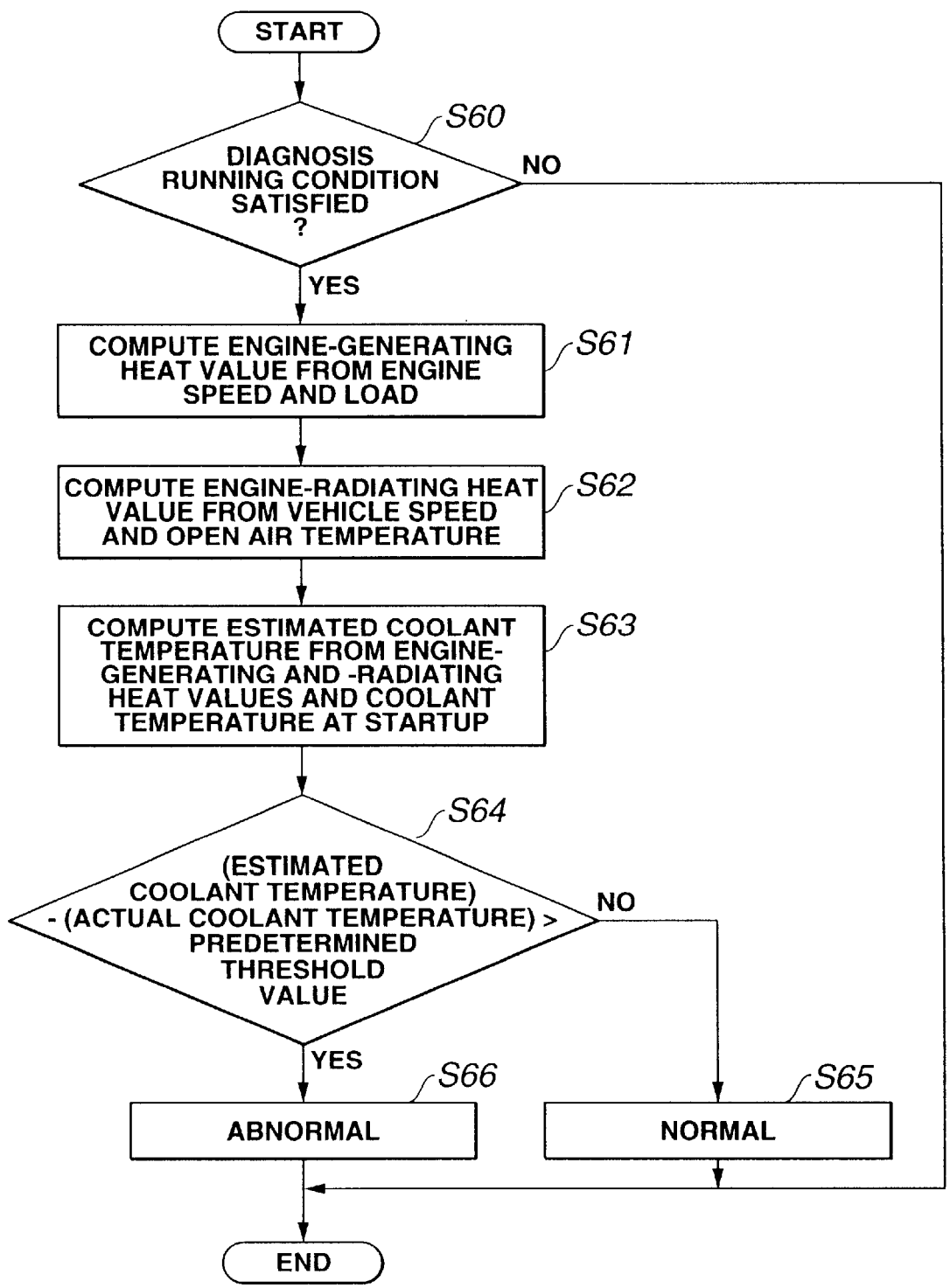
FIG. 11 is the flowchart of a thermostat diagnosis routine on the vehicle.

A thermostat diagnosis routine, shown in FIG. 11, for diagnosing a trouble on the open side of the thermostat 36 in the cooling system for the engine 1 will be described below.

In this thermostat diagnosis routine, the ECU first checks in step S60 whether the diagnosis running condition is satisfied. If the diagnosis running condition is not satisfied, the ECU exits the routine at once, and if the diagnosis running condition is satisfied, it proceeds to step S61 for executing the diagnosis.

In step S61, a heat value generated from the engine 1 (i.e., an engine-generating heat value) is computed from both the engine speed in accordance with the signal from the crank angle sensor 59 and the engine load represented by, e.g., the fuel injection volume or the intake air amount. Then, in step S62, the heat value radiated from the engine 1 (i.e., an engine-radiating heat value) is computed from both the vehicle speed detected by the speed sensor 65 and the atmospheric temperature estimated from the fuel temperature detected by the fuel temperature sensor 64 or the atmospheric temperature directly detected by the atmospheric temperature sensor that is separately provided. The engine-generating heat value and the engine-radiating heat value can be determined, by way of example, as follows. Actual results of the engine-generating heat value and the engine-radiating heat value are previously measured by, e.g., simulation or experiments, taking into account the engine type and displacement volume, the layout in an engine chamber, and the structure of the cooling system, and are stored in the form of a map. The engine-generating heat value is determined by referring to the map based on the engine speed and load, and the engine-radiating heat value is determined by referring to the map based on the vehicle speed and the open air temperature.

Then, the process flow goes to step S63 in which an estimated current (present) value of the coolant temperature (estimate coolant temperature) is computed on basis of the engine-generating heat value, the engine-radiating heat value, and the coolant temperature at the engine startup that has been previously stored at the engine startup.

Subsequently, the process flow goes to step S64 in which the actual coolant temperature detected by the coolant temperature sensor 54 is subtracted from the estimated coolant temperature, and whether a resulting coolant temperature difference exceeds the predetermined threshold value is checked.

If it is determined in step S64 that the coolant temperature difference does not exceed the predetermined threshold value, i.e., if the coolant temperature estimated from the engine operating condition substantially coincides with the actual coolant temperature detected by the coolant temperature sensor 54 within the allowable range, the process flow goes to step S65 in which the cooling system is determined as being normal. On the other hand, if the coolant temperature difference exceeds the predetermined threshold value, this is determined as indicating the fact that the actual coolant temperature does not reach a proper level corresponding to the operational condition because the thermostat 36 is opened at the lower level than the setted temperature and is in an excessively opened state, or because the thermostat 36 is in an open-seizure state in which it is seized at the open position. In step S66, therefore, the thermostat 36 is determined as being in the abnormal or trouble state, and the warning lamp 85 is lit up or blinked for issuing the alarm to the driver. The diagnosis process is thereby brought into an end.

The diagnosis for the fuel system of the engine 1 will be described below.

Figure 12:
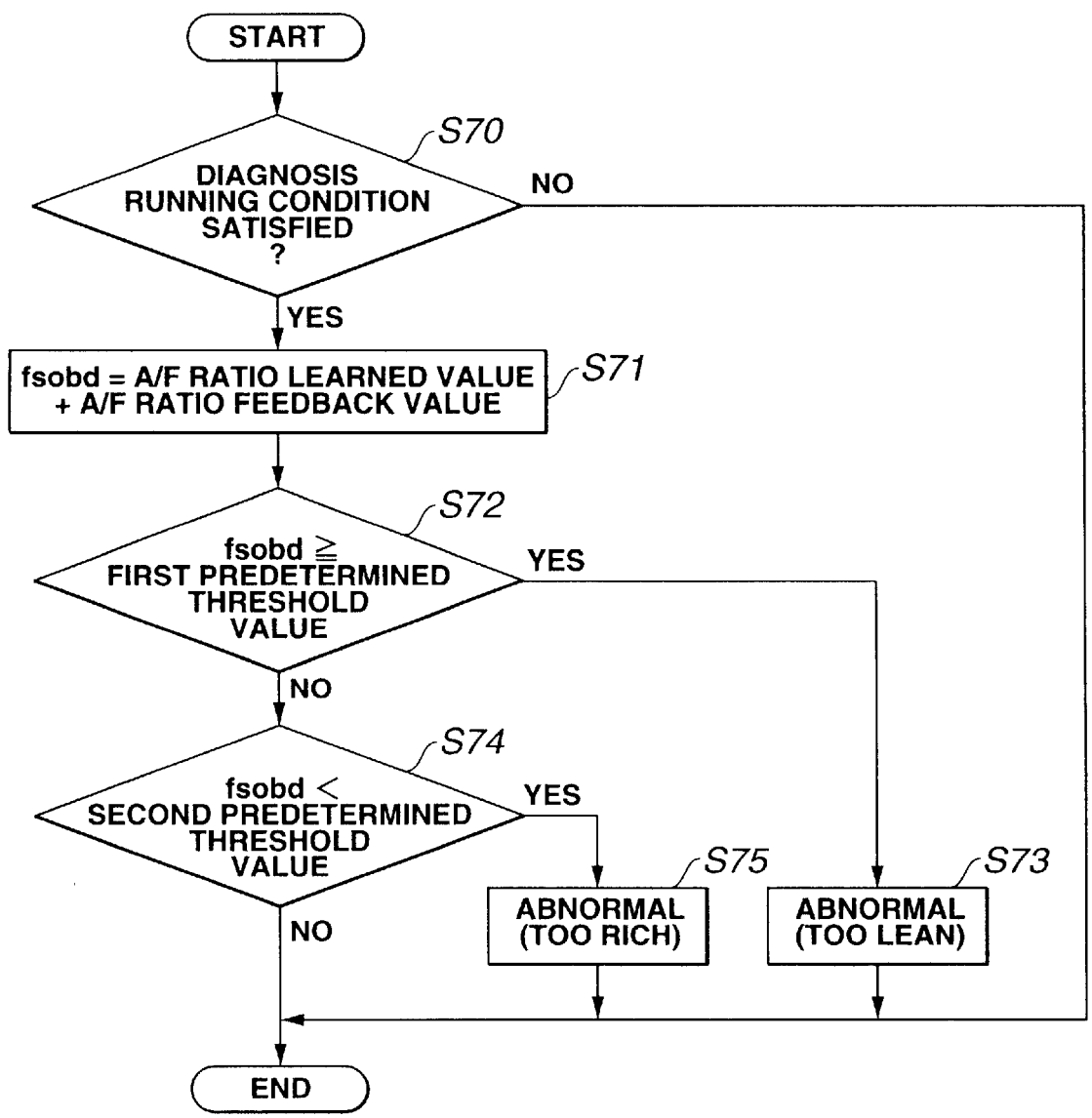
FIG. 12 is the flowchart of a fuel system diagnosis routine on the vehicle.

The fuel system diagnosis is executed by using a fuel system diagnosis routine shown in FIG. 12. The ECU first checks in step S70 whether a diagnosis running condition (e.g., the vehicle is under a steady operating status) is satisfied. If the diagnosis running condition is not satisfied, the ECU exits the routine at once, and if the diagnosis running condition is satisfied, it proceeds to step S71 for executing the diagnosis.

In step S71, a diagnosis value fsobd representing the current A/F control status is obtained by adding an A/F ratio feedback value that depends on a deviation between the target A/F ratio in the A/F control and the actual A/F ratio measured by the front A/F sensor 56, and a known A/F ratio learned value that is determined on basis of learning of the deviation between the target A/F ratio and the actual A/F ratio, for quickly compensating variations in the air intake system and the fuel supply system in the production stage (line) or deviations of the A/F ratio due to changes with the lapse of time.

Then, the process flow goes to step S72 in which the diagnosis value fsobd is compared with a first predetermined threshold value. The first predetermined threshold value is a threshold for determining whether compensation of the A/F ratio is made toward the rich side beyond the proper compensation range, and it is intended to decide an upper limit of the proper compensation range of the A/F ratio learned value and the A/F ratio feedback value which are increased or reduced from the target A/F ratio as a reference.

If fsobd≧(first predetermined threshold value) is determined in step S72, i.e., if the current A/F ratio control status is in such a condition that the A/F ratio is compensated toward the rich side beyond the proper compensation range, the process flow goes to step S73 in which it is determined that the current A/F ratio is largely deviated from the target A/F ratio to the lean side and is in a too lean abnormal state because of a trouble occurred in the fuel system. Thereafter, the ECU exits the routine.

If fsobd<(first predetermined threshold value) is determined in step S72, the process flow goes to step S74 in which the diagnosis value fsobd is compared with a second predetermined threshold value. The second predetermined threshold value is the threshold for determining whether the compensation of the A/F ratio is made toward the lean side beyond the proper compensation range, and it is intended to decide a lower limit of the proper compensation range of the A/F ratio learned value and the A/F ratio feedback value which are increased or reduced from the target A/F ratio as a reference.

If fsobd≧(second predetermined threshold value) is determined in step S74, it is determined that, at that time, the A/F ratio control is properly performed and the fuel system is functioning in a normal state. Then, the ECU exits the routine from step S74.

On the other hand, if fsobd<(the second predetermined threshold value) is determined in step S74, i.e., if the current A/F ratio control status is in such the condition that the A/F ratio is compensated toward the lean side beyond the proper compensation range, the process flow goes from step S74 to S75 in which it is determined that the current A/F ratio is largely deviated from the target A/F ratio to the rich side and is in the too-rich abnormal state because of the trouble occurred in the fuel system. Thereafter, the ECU exits the routine. If the fuel system is diagnosed as including a trouble upon the determination indicating the too-lean or too-rich abnormal state, the warning lamp 85 is lit up or blinked for issuing the alarm to the driver.

Figure 13:
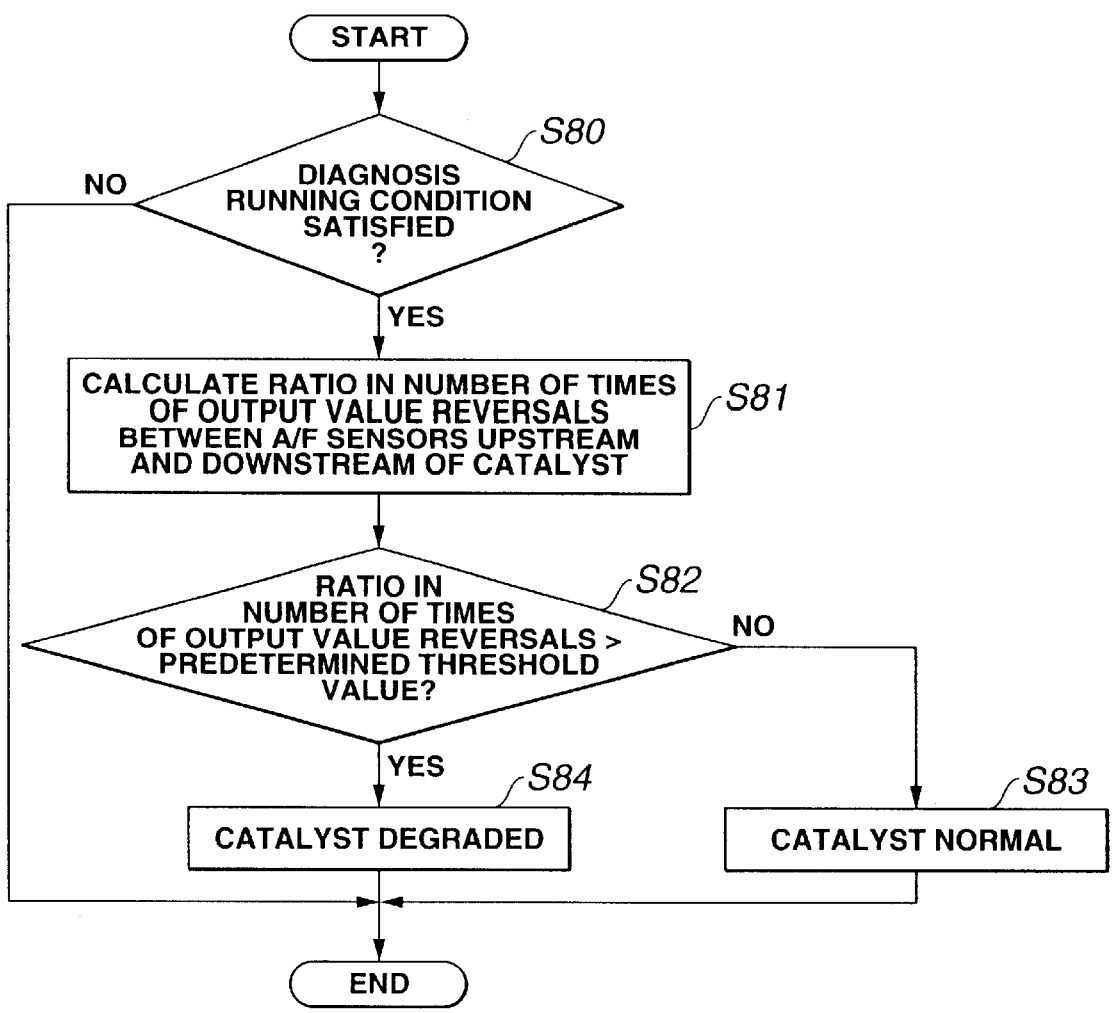
FIG. 13 is the flowchart of a catalyst diagnosis routine on the vehicle.

The diagnosis for the degradation (deterioration) of the catalyst in the catalytic converter 11 will be described below. The catalyst degradation diagnosis is executed by using a catalyst degradation diagnosis routine shown in FIG. 13.

In the catalyst degradation diagnosis routine, the ECU first checks in step S80 whether the diagnosis running condition (e.g., the catalyst is activated and the vehicle is under the steady operating status) is satisfied. If the diagnosis running condition is not satisfied, the ECU exits the routine at once, and if the diagnosis running condition is satisfied, it proceeds to step S81 for executing of the diagnosis.

In step S81, the ECU counts the number of times at which respective output values of the front A/F sensor 56 at the upstream side of the catalyst and the rear A/F sensor 57 at the downstream side of the catalyst have reversed relative to respective predetermined slice levels within a certain time, and then determines a ratio between the number of times of reversals in an output value of the front A/F sensor 56 and the number of times of reversals in the output value of the rear A/F sensor 57 (referred to as a "ratio in the number of times of output value reversals"). Then, the ECU proceeds to step S82 and determines degradation of the catalyst by checking whether the ratio in the number of times of the output value reversals exceeds the predetermined threshold value.

As well known, the cleaning capability of a catalyst has strong correlation with respect to the oxygen storage effect of the catalyst. Because of the oxygen storage effect of the catalyst, when the catalyst is not degraded, the cycle at which the output value of the front A/F sensor 56 is reversed from a rich state (in which the output value is higher than the slice level) to a lean state (in which the output value is lower than the slice level) and conversely from the lean state to the rich state, becomes longer than that of the cycle at which the output value of the rear A/F sensor 57 is reversed.

With the progress of the degradation of the catalyst, the oxygen storage effect of the catalyst is deteriorated and the output reversal cycle of the rear A/F sensor 57 becomes shorter. In other words, as the degradation of the catalyst progresses, output characteristics of the rear A/F sensor 57 disposed at the downstream side of the catalytic converter come closer to those of the front A/F sensor 56 disposed at the upstream side of the catalytic converter. Hence, a difference in the number of times of output value reversals between both the A/F sensors is gradually reduced.

Accordingly, the degradation of the catalyst can be determined by comparing the ratio between the number of times of the reversals in the output value of the front A/F sensor 56 and the number of times of the reversals in the output value of the rear A/F sensor 57 with the predetermined threshold value. Stated otherwise, if the number of times of the output value reversals≦the predetermined threshold value is determined in step S82, the ECU determines in step S83 that the catalyst is normal, and then exits the routine. If the number of times of the output value reversals>the predetermined threshold value is determined in step S82, the ECU proceeds to step S84 and determines that the catalyst is degraded (deteriorated). Upon the determination, the warning lamp 85 is lit up or blinked for issuing the alarm to the driver. Thereafter, the ECU exits the routine.

Figure 14:
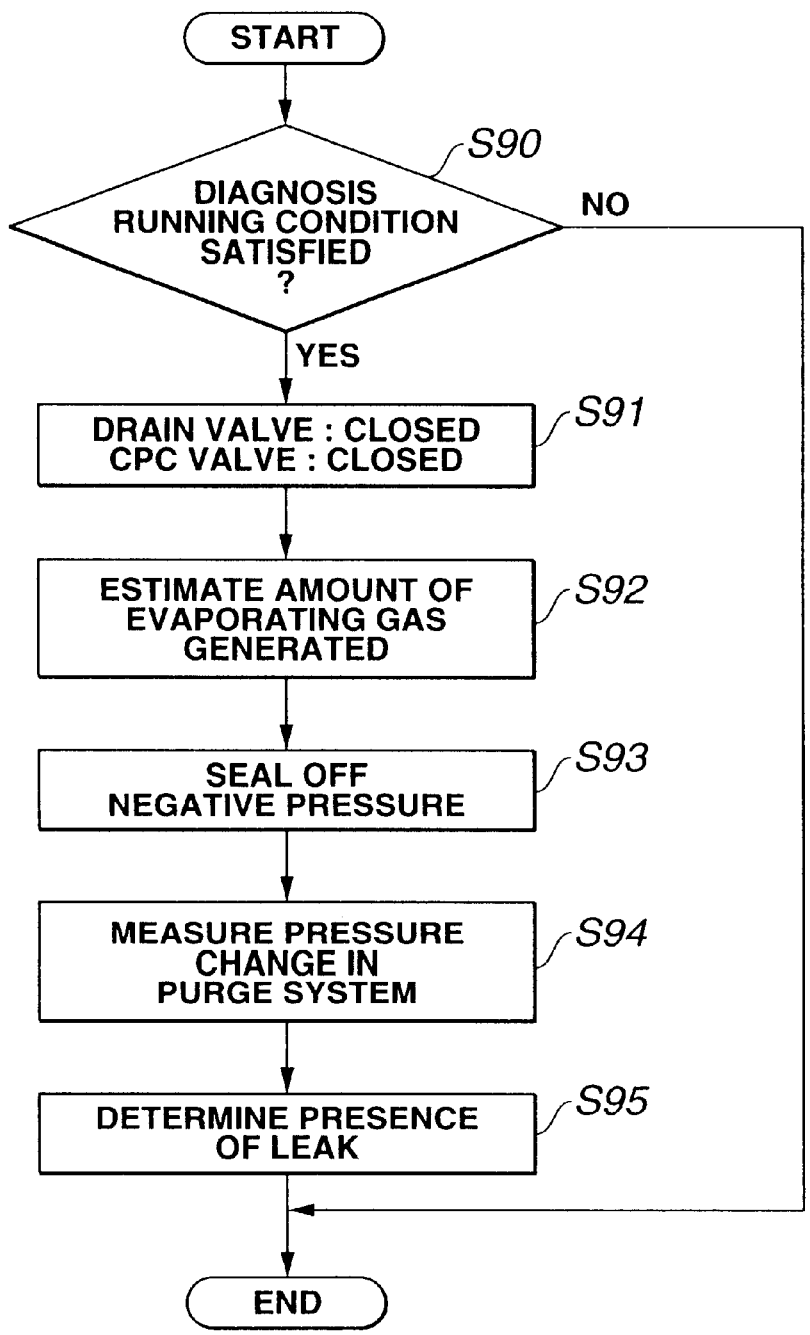
FIG. 14 is the flowchart of a diagnosis routine of an purge system on the vehicle.

The diagnosis of the purge system will be described below. The purge system diagnosis is executed by using an purge system diagnosis routine shown in FIG. 14.

In the purge system diagnosis routine, the ECU first checks in step S90 whether a diagnosis running condition is satisfied. The diagnosis running condition is given as follows. It is determined whether the pressure in the purge system, measured by the pressure sensor 62, is held within the setted positive pressure range when the purge system is formed into the state of a closed circuit. If the pressure in the purge system is held within the setted positive pressure range, the diagnosis running condition is determined as being satisfied.

If the diagnosis running condition is not satisfied in step S90, the ECU exits the routine at once, and if the diagnosis running condition is satisfied, it proceeds to step S91 in which the drain valve 27 and the CPC valve 29 are closed so that the purge system extending from the fuel tank 20 to the CPC valve 29 in the second purge passage 28 through the first purge passage 25 and the canister 26 is formed into the state of the closed circuit. Then, in step S92, a process of estimating the amount of generated evaporating gas is performed. During the execution of the diagnosis, the drain valve 27 is kept in a closed state.

Figure 15:
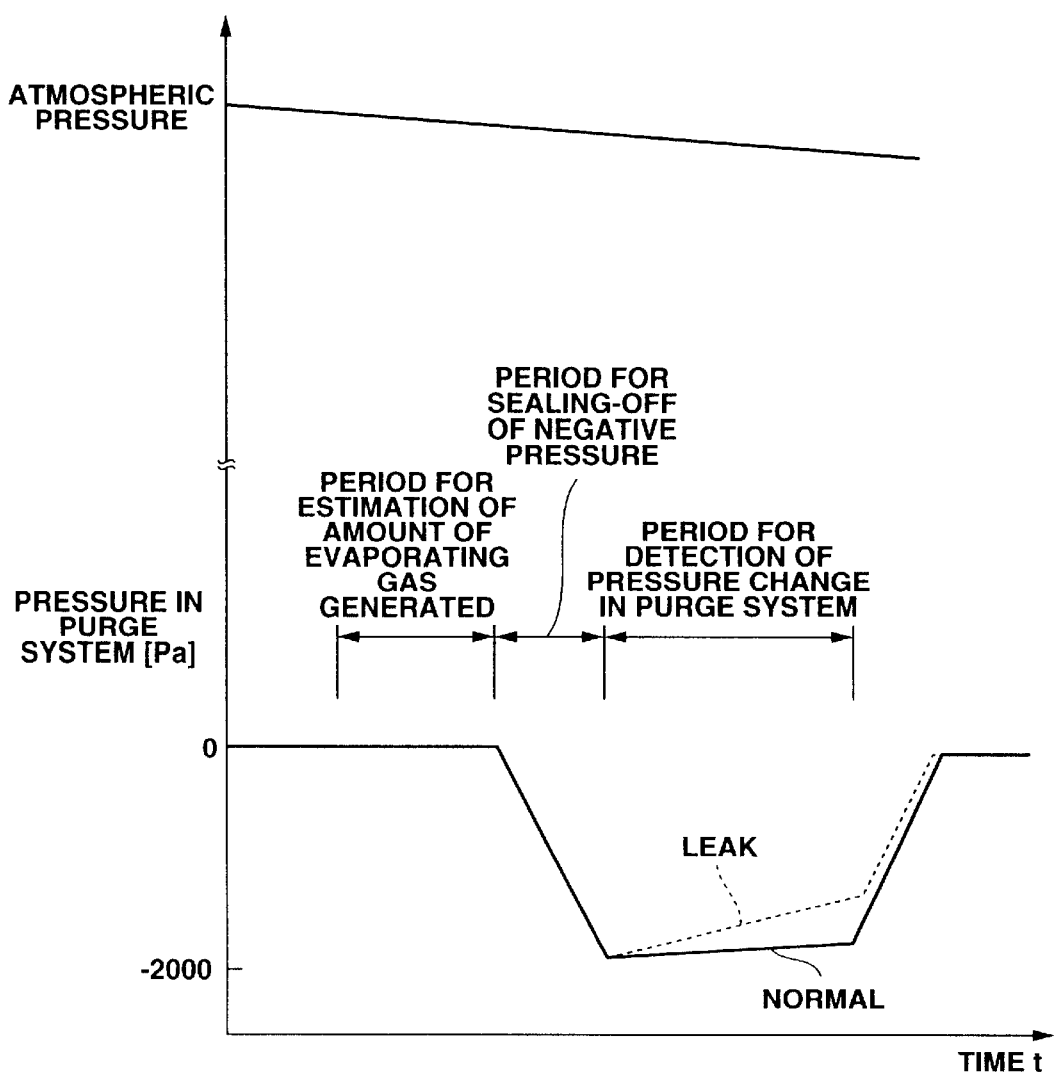
FIG. 15 is a graph showing changes of an atmospheric pressure and a pressure of the purge system.

As shown in FIG. 15, if there is no abnormality in the purge system, the pressure in the purge system, which is measured during a period for estimating the amount of the generated evaporating gas when the purge system is formed into the state of a closed circuit, rises with an increase in the amount of generated evaporating gas. Also, changes of the pressure in the purge system are affected upon shrinkage/expansion of the purge system due to a pressure difference between the pressure in the purge system and the atmospheric pressure.

In the process of estimating the amount of the generated evaporating gas the pressure change in the purge system measured by the pressure sensor 62, is corrected in dependency on the change of the atmospheric pressure measured by the atmospheric pressure sensor 66, thereby obtaining an actual amount of pressure change in the system. Then, the amount of the generated evaporating gas is estimated on the basis of the actual amount of the pressure change therein.

Subsequently, in step S93, a process of introducing a negative pressure into the purge system and of sealing off the negative pressure in the system is performed as a preprocess for determining a leak in the purge system. More specifically, the CPC valve 29 is opened to make the purge system open, and the negative pressure in the intake pipe is introduced into the purge system. The process makes an inside of the purge system a negative pressure state, as shown in FIG. 15. During such a period, the internal pressure of the purge system is monitored in accordance with a signal from the pressure sensor 62. When the internal pressure reaches the measurement permitted level (setted negative pressure), the CPC valve 29 is closed to seal off the negative pressure in the purge system.

Then, the process flow goes to step S94 in which a pressure change in the purge system is detected. The pressure change in the purge system is determined as an actual amount of the change by measuring both the pressure in the system at the start of the detection period and the pressure in the system after the lapse of a setted time (after the detection period) by the pressure sensor 62, and correcting the pressure change based on both the measured values depending on the atmospheric pressure change measured by the atmospheric pressure sensor 66. Then, in step S95, a leak determination is executed by comparing the pressure change in the purge system at the time when the amount of generated evaporating gas has been estimated, with the pressure change in the purge system after sealing off the negative pressure in the system. This diagnosis process is thereby brought into an end.

Further, as shown in FIG. 15, it is thought that the pressure in the purge system measured during the period for detecting the pressure change in the purge system also rises with an increase in the amount of generated evaporating gas. In the event that there is a leak location, such as a crack, in the purge system, the atmospheric air flows into the system through the leak location because the purge system is under a negative pressure condition. Hence, as indicated by a broken line in FIG. 15, the pressure rises at a steeper slope and the amount of the pressure change takes a larger value.

Thus, the pressure change in the purge system at the time is corrected in consideration of a difference in the amount of generated evaporating gas between positive pressure and negative pressure when the amount of the generated evaporating gas has been estimated. The corrected value is subtracted from the pressure change in the purge system after sealing off the negative pressure in the system. A resulting value is compared with a trouble predetermined threshold value (leak determination level). If a difference resulting from the comparison is not larger than the trouble predetermined threshold value, the purge system is determined as being in a normal condition (free from leak). If the difference exceeds the trouble predetermined threshold value, the purge system is determined as being failed (leaked). Then, the warning lamp 85 is lit up or blinked for issuing the alarm to the driver.

Figure 16:
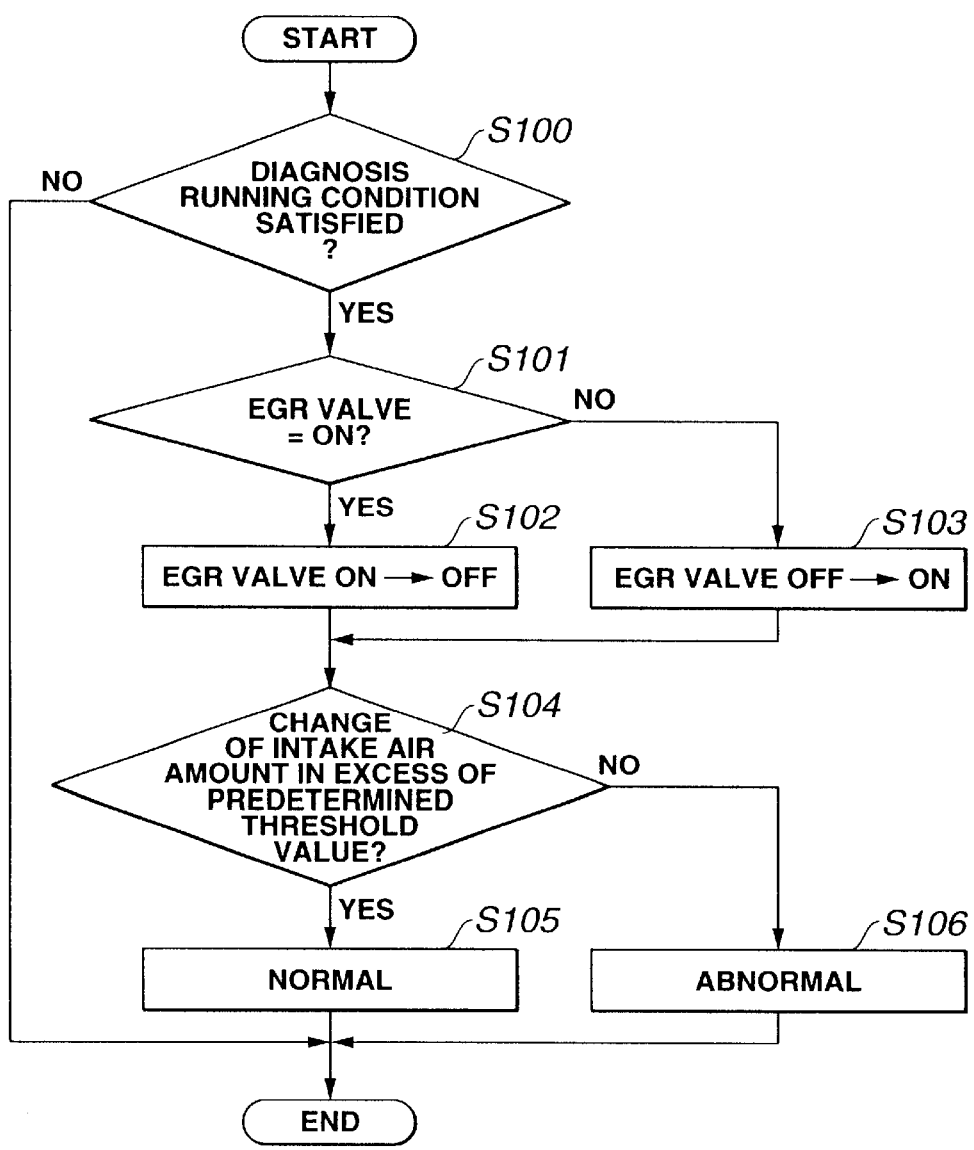
FIG. 16 is the flowchart of a diagnosis routine of an exhaust gas recirculation system on the vehicle side.

The diagnosis of the EGR system will be described below. The EGR system diagnosis is executed by using an EGR system diagnosis routine shown in FIG. 16.

In the EGR system diagnosis routine, the ECU first checks in step S100 whether a diagnosis running condition (e.g., under the fuel cutoff mode) is satisfied. If the diagnosis running condition is not satisfied, the ECU exits the routine at once, and if the diagnosis running condition is satisfied, it proceeds to step S101 for executing the diagnosis.

In step S101, the ECU checks the status of the output port of the I/O interface 77 through which a control signal for the EGR valve 31 is outputted, and determines whether the EGR valve 31 is turned on (opened). If the EGR valve 31 is turned on, the ECU proceeds to step S104 after switching over the EGR valve 31 from the ON to OFF (closed) state in step S102. If the EGR valve 31 is turned off, the ECU proceeds to step S104 after switching over the EGR valve 31 from the OFF to ON (open) state in step S103.

In step S104, the ECU measures a change of the intake air amount caused upon the EGR valve 31 being switched over from the ON (open) to OFF (closed) state or the OFF (closed) to ON (open) state, and then checks whether the amount of the measured change exceeds a predetermined threshold value.

More specifically, when the EGR valve 31 is opened, a portion of the exhaust gas is recirculated to the intake pipe at the downstream of the throttle valve 5a. Therefore, the intake manifold pressure (absolute pressure) rises as compared with that resulting when the EGR valve 31 is closed, and the intake air amount is reduced correspondingly. Also, when the EGR valve 31 is closed from the open state, the recirculation of the exhaust gas to the intake pipe is stopped. Therefore, the intake manifold pressure (absolute pressure) lowers as compared with the resulting condition when the EGR valve 31 is opened, and the intake air amount is increased correspondingly. In view of the above, changes of the intake air amount in the diagnosis running range caused upon the EGR valve 31 being switched over from the ON to OFF state or the OFF to ON state are previously measured by, e.g., simulation or experiments, taking into account the engine type, the structure of the EGR system, and so on. Then, the predetermined threshold value for use in the diagnosis is set based on the measured results.

Instead of changes of the intake air amount, the changes of the intake manifold pressure or the changes of the EGR gas temperature caused upon the EGR valve 31 being switched over from the ON to OFF state or the OFF to ON state may also be used.

If the change of the intake air amount exceeds the predetermined threshold value in step S104, the ECU determines in step S105 that the EGR system including the EGR valve 31 is normal, and then exits the routine. On the other hand, if the change of the intake air amount does not exceed the predetermined threshold value, the ECU proceeds from step S104 to S106 and determines that the EGR system is in the abnormal state because of a valve seizure trouble of the EGR valve 31 being seized (clogged) in the open or closed state, a malfunction of the EGR valve 31, a reduction of a cross-sectional area of the EGR passage 30 due to a deposition of carbon, or a trouble in a driving system of the EGR valve 31. Thereafter, the ECU exits the routine. In the event that the EGR system is determined as being in the abnormal state, the warning lamp 85 is lit up or blinked for issuing the alarm to the driver.

The misfire diagnosis for diagnosing the existence of a misfire in the ignition system will be described below.

The misfire diagnosis in this embodiment is executed based on the fact that, as well known, there is a strong correlation between the pressure in the cylinder under the combustion stroke (i.e., combustion pressure) and a change of the engine speed between the current combustion stroke and the next combustion stroke. Therefore, a change of the engine speed due to a misfire is calculated as a difference in the engine speed between those of the cylinders in respective predetermined crank angle. The occurrence of a misfire is determined by comparing the difference in the engine speed with the predetermined threshold value.

Figure 17:
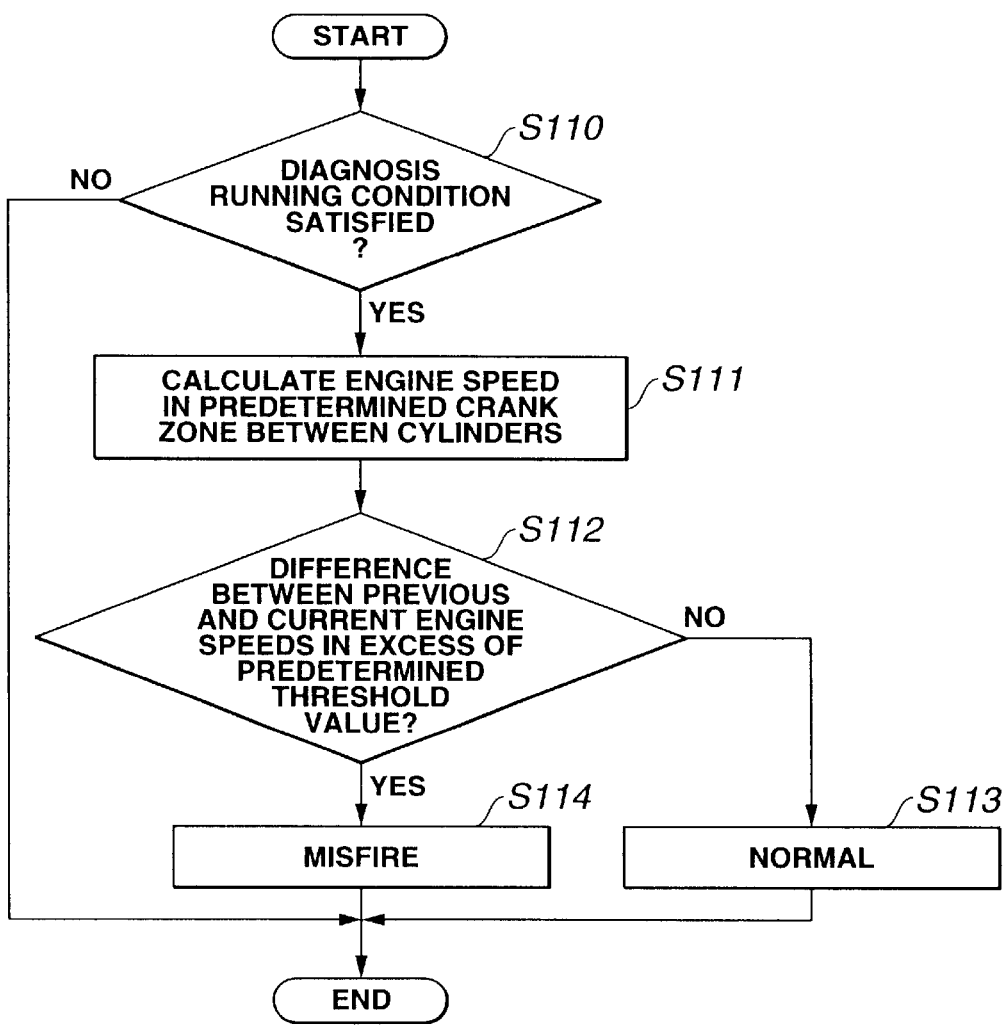
FIG. 17 is the flowchart of a misfire diagnosis routine on the vehicle side.

More specifically, in the misfire diagnosis routine shown in FIG. 17, the ECU first checks in step S110 whether a diagnosis running condition (e.g., the vehicle is not under the fuel cutoff mode, but under the steady operating state in a predetermined operating range) is satisfied. If the diagnosis running condition is not satisfied, the ECU exits the routine at once, and if the diagnosis running condition is satisfied, it proceeds to step S111 for executing the diagnosis.

In step S111, for each cylinder currently under the combustion stroke, the engine speed in the predetermined crank angle of the respective cylinders is calculated on basis of a signal from the crank angle sensor 59. Then, the ECU proceeds to step S112 and checks whether the difference between the engine speed previously calculated and the engine speed currently calculated in the same crank angle of the respective cylinders exceeds the predetermined threshold value.

If the difference in the engine speed does not exceed the predetermined threshold value in step S112, the ECU determines in step S113 that there occurs no misfire and the engine combustion status is normal, and then exits the routine. If the difference in the engine speed exceeds the predetermined threshold value, the ECU determines in step S114 that there occurs the misfire, whereupon the warning lamp 85 is lit up or blinked for issuing the alarm to the driver. Thereafter, the ECU exits the routine.

Figure 18:
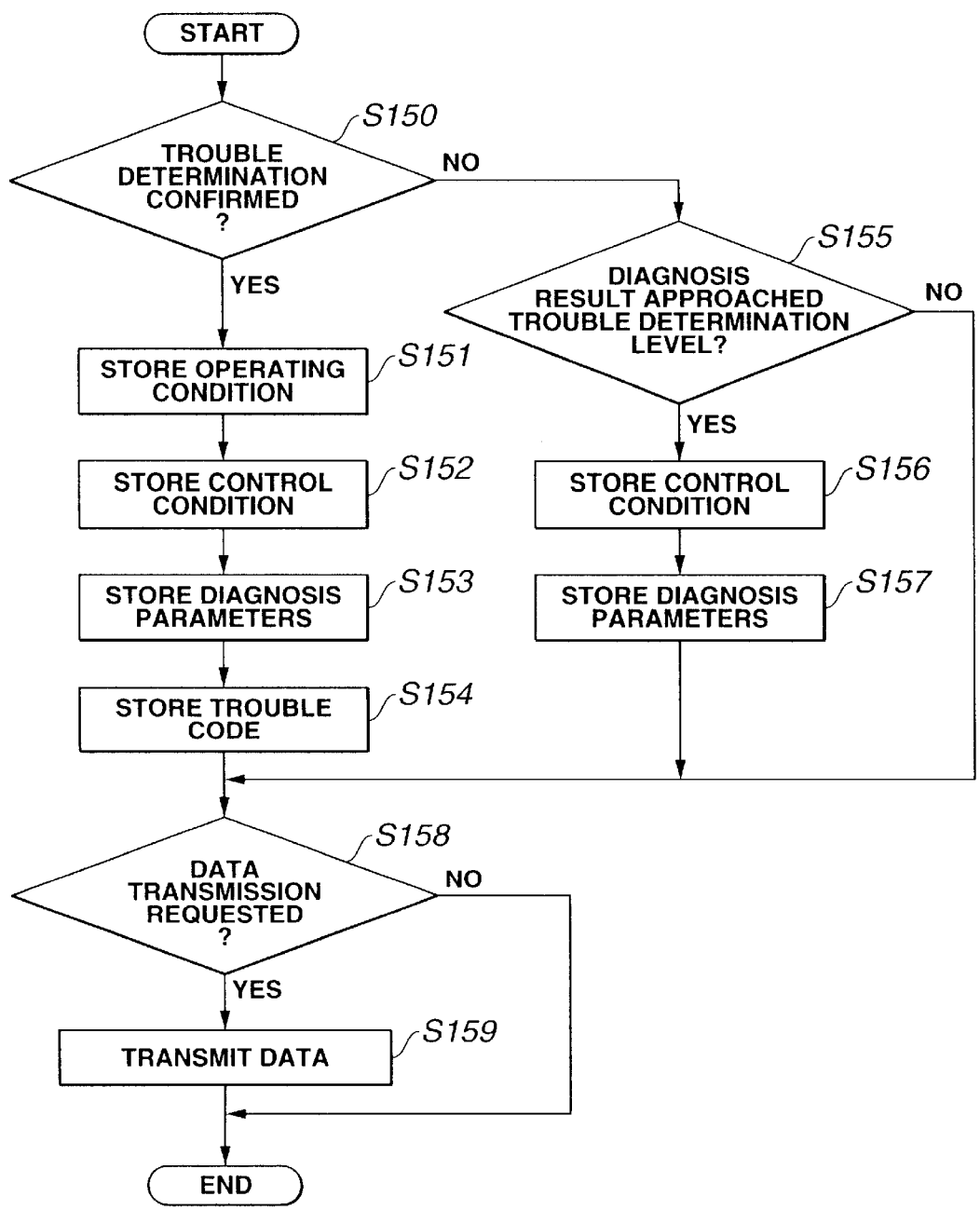
FIG. 18 is the flowchart of a diagnosis information processing routine on the vehicle side.

Various kinds of the diagnosis information described above are stored in the backup RAM 74 in the ECU 70 by using a diagnosis information processing routine shown in FIG. 18. When the user transmits the vehicle information through the cellular phone 110, the diagnosis information stored in the backup RAM 74 is also transmitted, as a part of the vehicle information of the vehicle 100, to the central information management center 151 and accumulated in the database DB.

In the diagnosis information processing routine shown in FIG. 18, the ECU first checks in step S150 whether a trouble determination is confirmed. If the trouble determination is confirmed, the ECU proceeds from step S150 to S151 in which the operating status parameters regarding the diagnosis target, such as the engine speed, the engine load, the coolant temperature, the vehicle speed, the lapsed time after the engine startup, the EGR gas temperature, the fuel temperature and the fuel level, are written and stored in the backup RAM 74 over a predetermined number of times of ignitions or for a predetermined time during the execution of the diagnosis or before and after the execution of the diagnosis.

Then, the ECU proceeds to step S152. In step s152, the control status parameters regarding the diagnosis target are written and stored in the backup RAM 74 over the predetermined number of times of the ignitions or for the predetermined time during the execution of the diagnosis or before and after the execution of the diagnosis. The control status parameters include the fuel injection volume, the A/F ratio, the A/F ratio compensation amount, the A/F ratio learned value, the ignition timing, the control variables of the purge system (ON/OFF signal of the drain valve 27 and the control stroke of the CPC valve 29), and the control stroke in ISC.

In consideration of the storage capacity of the backup RAM 74 and the diagnosis specifications of individual diagnosis targets, the operating status parameters and the control status parameters may be limited to typical ones that have strong correlation with respect to the diagnosis target.

Subsequently, the ECU proceeds to step S153 in which diagnosis parameters for each diagnosis are stored in respective areas corresponding to the operating status and the control status. The diagnosis parameters include, for example, parameters directly used in the actuator functional diagnosis and the sensor functional diagnosis, signal levels of voltage, current, etc. upon the disconnection/short-circuit occurred in the wiring system (circuits) for the input/output units, and the parameters used in the computation executed during the diagnosis.

More specifically, in the engine cooling system diagnosis, the diagnosis parameters, such as the heat value generated from the engine, the heat value radiated from engine, the estimated coolant temperature, and the actually detected coolant temperature, are stored in respective areas corresponding to the operating status and the control status. In the fuel system diagnosis, the diagnosis parameters, such as the A/F ratio learned value, the A/F ratio feedback value, the diagnosis value fsobd as the sum of the two former values, and the first and second predetermined thresholds values, are stored in respective areas corresponding to the operating status and the control status.

Also, in the catalyst degradation (deterioration) diagnosis, the diagnosis parameters, such as the number of times of the reversals in the output value of the front A/F sensor 56, the number of times of the reversals in output value of the rear A/F sensor 57, the ratio between both values of the number of times of the output value reversals, and the predetermined threshold value, are stored in the respective areas corresponding to the operating status and the control status. In the purge system diagnosis, the diagnosis parameters, such as the estimated value of the amount of the generated evaporating gas, the pressure value in the purge system, and the change of the pressure value therein, are stored in the respective areas corresponding to the operating status and the control status.

Further, in the EGR system diagnosis, the diagnosis parameters, such as the ON/OFF control command value for the EGR valve 31, the change of the intake air amount at that time, and the predetermined threshold value, are stored in the respective areas corresponding to the operating status and the control status. In the misfire diagnosis of the ignition system, the diagnosis parameters, such as the engine speed in the predetermined crank angle, the difference between the previous and current engine speeds, and the predetermined threshold value, are stored in the respective areas corresponding to the operating status and the control status.

Then, after storing the trouble code corresponding to the trouble occurred in the diagnosis target in step S154, the ECU proceeds to step S158.

On the other hand, if the trouble determination is not confirmed in step S150 and the trouble is not definitely determined, the ECU proceeds from step S150 to S155 and checks whether there is a high possibility that the diagnosis result comes closer to the predetermined trouble level and the trouble will occur in near future.

For example, in the disconnection/short-circuit diagnosis of the wiring system (circuits) for the input/output units, when the occurrence of the disconnection/short-circuit is not definitely determined, but the disconnection/short-circuit frequently occurs in a short time due to a contact failure (an insufficient contact), etc., it is determined that the trouble will occur in the near future with the high possibility.

Also, in the diagnosis of the front A/F sensor 56, the time required for the sensor output value to reach a value corresponding to the target A/F ratio does not exceed the predetermined threshold value, but the sensor output value reaches the value corresponding to the target A/F ratio in a time very close to the predetermined threshold value. In this case, it is determined that a trouble will occur (the response of the front A/F sensor 56 will deteriorate beyond the specified range) in the near future with the high possibility. In the diagnosis process of the rear A/F sensor 57, when the sensor output value is reversed within the diagnosis time, but the reversing time is very close to the diagnosis time, it is determined that the trouble will occur (the response of the rear A/F sensor 57 will deteriorate beyond the specified range) in the near future with the high possibility.

Further, in the misfire diagnosis of the ignition system, when the difference in the engine speed between the cylinders in respective predetermined crank angles does not exceed the predetermined threshold value, but it locates at a point within the setted range close to the predetermined threshold value, or when the A/F ratio learned value is close to the upper limit value on the rich side or the lower limit value on the lean side, or when the ignition timing learned value is close to the upper limit value of the advance or the lower limit value of the retard, it is determined that the misfire will occur in the near future with the high possibility. On the other hand, when a variation in an engine rotation (difference in the engine speed) is small and the engine rotation is stable, it is determined that there is no fear of the misfire in the near future.

Subsequently, if the diagnosis result is not close to the trouble causing level and a possibility of the trouble occurrence in the near future is low, the ECU jumps from step S155 to S158. If the diagnosis result indicates the high possibility of the trouble occurrence in the near future, the ECU proceeds from step S155 to S156 in which, similarly to above step S152, the controls status parameters regarding the diagnosis target are written and stored in the backup RAM 74. Further, in step S157, the diagnosis parameters for use in each diagnosis are written and stored in the backup RAM 74. Thereafter, the ECU proceeds to step S158. The diagnosis parameters written and stored in step S157 are those ones which are obtained when the determination of the trouble occurrence is not definite at the present time, but the occurrence of trouble in the near future is predicted, as described above, including the signal levels of the voltage, the current, etc. in the disconnection/short-circuit diagnosis of the wiring system (circuits) for the input/output units and the number of times of the disconnection/short-circuit occurred in a short time due to the insufficient contact, etc. The parameters obtained in any other diagnosis when the diagnosis result is close to the trouble predetermined threshold value level are also written and stored in the backup RAM 74.

In step S158, it is checked whether there is a data transmission request with the operation of the cellular phone 110 for transmitting the vehicle information. If there is no data transmission request, the ECU exits the routine. If there is the data transmission request, the ECU proceeds to step S159 in which the data in the backup RAM 74 is transmitted via the network 101 in the vehicle. Thereafter, the ECU exits the routine. Note that, for ensuring a storage area for the next cycle of the diagnosis, the diagnosis information stored in the backup RAM 74, except for the trouble data, is cleared after the transmission to the central information control center 151.

Figure 19:
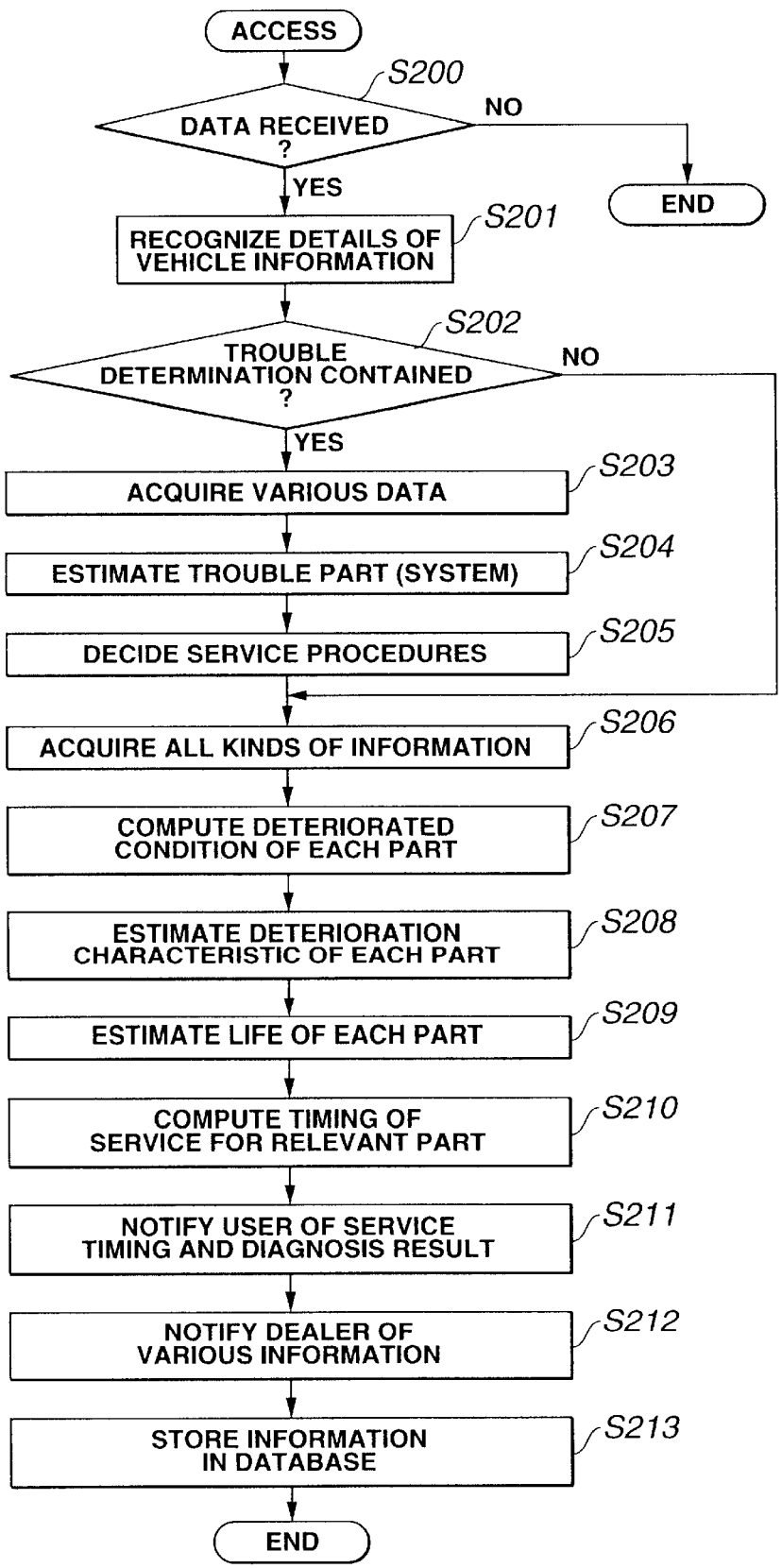
FIG. 19 is the flowchart of an information processing routine in a central information control center.

On the other hand, an information processing routine shown in FIG. 19 is executed by the host computer 151a in the central information control center 151. In the information processing routine shown in FIG. 19, the host computer first checks in step S200 whether the vehicle information is received with access from the cellular phone 110. If no data is received, the host computer exits the routine at once. If the data is received, the host computer proceeds to step S201 in which the data type of the received vehicle information and the corresponding system are identified based on the vehicle identification number, the user ID code, the mileage (distance traveled), the date and time at which the data has been received, etc. Then, in step S202, it is checked whether the vehicle information contains the diagnosis determination result indicating the presence of trouble.

If the diagnosis determination result indicating the presence of the trouble is not contained and no particular abnormality is confirmed, the host computer jumps from step S202 to S206. If the diagnosis determination result indicating the presence of the trouble is contained, the host computer proceeds from step S202 to S203 and acquires various data, such as the operating status parameters, the control status parameters, and the diagnosis parameters, corresponding to the occurrence of the trouble. Then, the host computer proceeds to step S204 in which the acquired data are analyzed to estimate the trouble location in the system and/or parts. Subsequently, after deciding service procedures for repair and service in step S205, the host computer proceeds to step S206.

More specifically, when the diagnosis target is an actuator, the type and level of trouble are confirmed and the parts necessary for the repair and the service procedures are decided based on the control variables of the actuator, the input parameter to be changed with operation of the actuator, the predetermined threshold value for use in the trouble determination, the trouble code, and the operating status and the control status during the diagnosis or before and after the diagnosis. When the diagnosis target is a sensor, the type and level of the trouble are confirmed and parts necessary for the repair and the service procedures are decided on the basis of the sensor value inputted from the sensor, other related parameters, the predetermined threshold value for use in the trouble determination, the trouble code, and the operating status and the control status during the diagnosis or before and after the diagnosis.

Also, when the self-diagnosis of the vehicle (ECU 70) determines that there is the trouble in the A/F sensor, the type and level of the trouble are confirmed and the parts necessary for the repair and the service procedures are decided on the basis of the sensor value inputted from the A/F sensor, other related parameters, the predetermined threshold value for use in the trouble determination, the trouble code, and the operating status and the control status during the diagnosis or before and after the diagnosis.

The following examples (30), (31) represent the trouble causes and the trouble locations estimated from the operating status and the control status when there occurs the abnormality in the A/F sensor. As seen from the following examples, it is possible to estimate the trouble locations from the operating status and the control status, and to take prompt actions of ordering necessary parts and deciding service procedures.

(30) The response time of the A/F sensor is relatively long in the operating range in which the intake air amount is small, and is relatively short in the operating range in which the intake air amount is large. For this example, it is estimated that a problem given below occurs because the flow rate of the exhaust gases is also relatively small in the operating range in which the intake air amount is small.

(30-a) An exhaust gas inlet port of the A/F sensor is reduced due to, e.g., the deposition of carbon, and hence prompt detection of the A/F ratio is impaired.

(31) The response time of the A/F sensor is evenly long over the entire operating range. For this example, it is thought that the abnormality occurs around a sensor of the A/F sensor, and it is estimated that any of problems given below occurs.

(31-a) The sensor is subjected to harmful components in the exhaust gas and hence degraded.

(31-b) A disconnection or any other trouble occurs in a heater for warming up the sensor of the A/F sensor, and hence the sensor is not sufficiently activated.

Further, when the self-diagnosis system of the vehicle (ECU 70) determines that there is the trouble of disconnection/short-circuit in the wiring system including the input/output units such as the sensors and actuators, the type of the disconnection/short-circuit is confirmed, which one of the connectors, the wires and the input/output units causes the disconnection/short-circuit is estimated, and the parts necessary for the repair and the service procedures are decided on the basis of the signal levels of the voltage, the current, etc. in the wiring system for the diagnosis target, the predetermined threshold value for use in the trouble determination, the trouble code, and the operating status and the control status during the diagnosis or before and after the diagnosis.

Still further, when the self-diagnosis system of the vehicle (ECU 70) determines that there is the trouble in the thermostat 36 of the engine cooling system, the level of the trouble is pursued, whether the trouble is attributable to only the thermostat 36 is confirmed, and the parts necessary for the repair and the service procedures are decided on the basis of not only the diagnosis parameters such as the heat value generated from engine, the heat value radiated from engine, the estimated coolant temperature, the actual coolant temperature, and the predetermined threshold value, including the trouble code, but also on the operating status and the control status during the diagnosis or before and after the diagnosis.

For example, when the actual coolant temperature does not rise due to the cause other than the thermostat 36, the thermostat diagnosis is made to determine whether there is the possibility that the difference between the estimated coolant temperature and the actual coolant temperature exceeds the predetermined threshold value and hence a thermostat failure is determined. As a result, there is the possibility that the thermostat 36 is determined as being failed because a relay contact is brought into a normally closed state due to the trouble of the radiator fan relay 86 and the actual coolant temperature does not rise with a continuous operation of the radiator fan 48. In such a case, check of the system including the radiator fan 48 is also put into the service procedures in addition to the thermostat 36.

Still further, when the self-diagnosis system of the vehicle (ECU 70) determines that there is the abnormality in the fuel system, the location and the level of the trouble in the fuel system are determined and the parts necessary for the repair and the service procedures are decided on the basis of not only the diagnosis parameters such as the A/F ratio learned value, the A/F ratio feedback value, the A/F ratio diagnosis value fsobd as the sum of the two former values, and the first and second predetermined threshold values, including the trouble code, but also on the operating status and the control status during the diagnosis or before and after the diagnosis.

The following examples (40) to (44) represent the trouble causes and the trouble locations estimated from the operating status and the control status when there occurs the abnormality in the fuel system. As seen from the following examples, it is possible to estimate the trouble locations and to take the prompt actions of ordering the necessary parts and deciding the service procedures, even when the diagnosis indicates no trouble in the individual parts, but the entire fuel system is diagnosed as being in the abnormal state.

(40) The A/F ratio is determined as being in the abnormal state because the A/F ratio is too rich or too lean over the entire operating range. With this example, it is thought that the fuel pressure, the intake air amount, or the A/F ratio is not detected in a normal manner (condition), and it is estimated that any of problems given below occurs.

(40-a) The control pressure for the pressure regulator 23 is offset.

(40-b) The output value of the air flow sensor 50a is offset.

(40-c) The output value of the front A/F sensor 56 is offset.

(41) The A/F ratio shows the abnormality condition of too lean in the range in which the fuel injection volume per ignition is small, and a lean proportion of the A/F ratio is small in the range in which the fuel injection volume per ignition is large. This example represents the abnormality in the low load range in which an error of the fuel volume and the air amount causes a large effect, thus indicating an excessively large air amount or an excessively small fuel volume. It is hence estimated that any of problems given below occurs.

(41-a) The intake pipe 6 has a crack or the like, and air is induced in addition to the air amount measured by the air flow sensor 50a.

(41-b) Because of, e.g., an imperfect contact of the harness for the fuel injector 15, the voltage actually supplied to the fuel injector 15 is lower than the battery voltage recognized by the ECU 70, and the actual fuel injection volume is smaller than the value computed by the ECU 70.

(42) A lean side proportion of the A/F ratio is small in the range in which the fuel injection volume per an ignition is small, and the A/F ratio shows the too lean condition in the range in which the fuel injection volume per ignition is large. This example represents the abnormality in which the A/F ratio becomes too lean as the fuel supply volume increases. It is hence estimated that a problem given below occurs.

(42-a) The fuel cannot be delivered in specified amount due to the trouble of the fuel pump 21, whereby the fuel pressure is lowered and the fuel injection volume from the fuel injector 15 is insufficient in the range in which the fuel injection volume is increased.

(43) The A/F ratio shows a too rich condition in the range in which the fuel injection volume per ignition is small, and a rich proportion of the A/F ratio is small in the range in which the fuel injection volume per ignition is large. This example represents the abnormality in the low load range in which an error of the fuel volume and the air amount causes a large effect, thus indicating an excessively small air amount or an excessively large fuel volume. It is hence estimated that any of the problems given below occurs.

(43-a) Because of the crack, pipe connection disengagement, etc. of the line pipe through which the intake pipe pressure is introduced to the pressure regulator 23, the fuel pressure controlled by the pressure regulator 23 is always regulated with respect to the atmospheric pressure as a reference instead of the intake pipe pressure at the downstream side of the throttle valve 5a, which corresponds to the atmospheric pressure at the fuel injector 15. Therefore, in the low load range in which the throttle opening degree is reduced and the negative pressure in the intake pipe is lowered, the fuel pressure in the fuel injector 15 is relatively raised and the fuel injection volume is overly increased.

(43-b) Because of, e.g., the imperfect contact of the harness for reading the battery voltage of the ECU 70, the battery voltage recognized by the ECU 70 is lower than the actual battery voltage. Therefore, the voltage actually supplied to the fuel injector 15 is higher than the compensated battery voltage based on a computation of the fuel injection volume executed in the ECU 70, and the fuel injection volume is overly increased as a result of an excessive compensation.

(43-c) The EGR valve 31 is seized (locked) at the open state due to, e.g., the deposition of carbon, thus resulting in such a condition that the EGR is always effective. Particularly, in the low load range in which the intake air amount is small, the fuel volume is overly increased due to the effect of the EGR.

(44) A rich proportion of the A/F ratio is small in the range in which the fuel injection volume per ignition is small, and the A/F ratio shows a too rich condition in the range in which the fuel injection volume per ignition is large. This example represents the abnormality in which the A/F ratio becomes too rich in the high load range. It is hence estimated that a problem given below occurs.

(44-a) The CPC valve 29 is seized at the open state, thus resulting in such a condition that the evaporating fuel is always purged. Particularly, the fuel volume is overly increased in the high load range in which the large amount of the evaporating gas is generated in.

Still further, when the self-diagnosis system of the vehicle (ECU 70) determines that the catalyst is degraded, the degraded condition of the catalyst is determined and the parts necessary for the repair and the service procedures are decided on basis of not only the diagnosis parameters, but also the operating status and the control status during the diagnosis or before and after the diagnosis. The diagnosis parameters include the number of times of the reversals in the output value of the front A/F sensor 56, the number of times of the reversals in the output value of the rear A/F sensor 57, the ratio between both values of the number of times of the output value reversals, and the predetermined threshold value, including the trouble code.

Still further, when the self-diagnosis system of the vehicle (ECU 70) determines that there is a trouble (leak) in the purge system, the location and the level of the trouble in the purge system are determined and the parts necessary for the repair and the service procedures are decided on the basis of not only various factors, but also the operating status and the control status during the diagnosis or before and after the diagnosis. The above various factors include the estimated amount of the evaporating gas generated in the purge system, the pressure in the system, the change of the pressure in the system, the predetermined threshold value (leak determination level), and the trouble code.

For example, during the execution of the diagnosis process for the purge system, when the pressure in the system is not lowered to the setted negative pressure even after outputting a valve-closing operation signal to the drain valve 27, outputting a valve-opening operation signal to the CPC valve 29, and introducing a negative pressure into the purge system, it can be determined that the leak determination has been made because of an open-state seizure of the drain valve 27 or a closed-state seizure of the CPC valve 29. On the other hand, when the pressure in the system rises to a large extent after being normally lowered to the setted negative pressure, it can be determined that the leak determination has been made because of an inflow of the atmospheric air due to, e.g., the crack occurred in the piping system. It is hence possible to estimate the level of the leak from the degree of rise of the pressure, and to specify the leak location from the arrangement of the piping system.

Also, when the pressure change in the purge system occurs in the negative direction in an excess of a predetermined value before a control signal for the valve-opening operation is outputted to the CPC valve 29 from the operating status and the control status at the startup of the diagnosis for the purge system, it can be determined that the CPU valve 29 has the trouble and is seized at the open state. In the case of outputting a control signal for bringing the drain valve 27 from the closed state to the open state from the operating status and the control status at the end of the diagnosis process for the purge system, if the pressure change in the purge system at that time is not larger than a predetermined value, it can be determined that the drain valve 27 has the trouble and is seized at the closed state.

Still further, when the self-diagnosis procedure of the vehicle (ECU 70) determines that there is the abnormality in the EGR system, the location and the level of the trouble in the EGR system are determined on the basis on the diagnosis parameters for the EGR system, including the trouble code, and the operating status and the control status during the diagnosis or before and after the diagnosis.

For example, by checking, in addition to the change of the intake air amount upon switching over of the EGR valve 31 from the ON to OFF state or from the OFF to ON state, the other correlated parameters including the intake pipe pressure during the diagnosis or before and after the diagnosis, the EGR gas temperature, etc., it is possible to estimate which one of the troubles occurs; namely, the open-state seizure of the EGR valve 31, the closed-state seizure of the EGR valve 31, or the valve malfunction. Moreover, which one of the EGR passage 30 and the EGR valve 31 causes the abnormality can be estimated from the operating status and the control status before and after the diagnosis process. As a result, it is possible to take prompt actions of ordering the necessary parts and deciding the service procedures, even when the entire EGR system is diagnosed as being in the abnormal state.

Still further, when the self-diagnosis system of the vehicle (ECU 70) determines that there occurs a misfire, the cause of the misfire is estimated from conditions of the fuel system, the ignition system, the other systems and the parts thereof, and the parts necessary for the repair and service procedures are decided, taking into account the misfire diagnosis parameters such as the engine speed in the predetermined crank angle zone, the difference between the previous and current engine speeds, and the predetermined threshold value, including the trouble code, and the operating status and the control status during the diagnosis or before and after the diagnosis.

The following examples (50) to (53) represent the misfire causes and the trouble locations estimated from the diagnosis parameters, the operating status parameters and the control status parameters. As seen from the following examples, it is possible to estimate the cause of the misfire and to take prompt actions of ordering the necessary parts and deciding service procedures.

(50) A misfire occurs over the entire operating range. With this example, it is thought that there is the abnormality in the ignition system or the fuel system, and it is estimated that any of the problems given below occurs.

(50-a) Because of the abnormality in the ignition system including the igniter 18, the ignition coil 17, the spark plug 16, etc., a normal ignition cannot be achieved, thus giving rise to the misfire.

(50-b) Because of the abnormality in the fuel system, e.g., an offset of the control pressure for the pressure regulator 23, an offset of the output value of the air flow sensor 50a, or the offset of the output value of the front A/F sensor 56, the A/F ratio becomes too rich or too lean, thus causing the misfire.

(50-c) Because of the abnormality in the crank position detecting system including the crank angle sensor 59 and the cam angle sensor 61, the actual ignition timing is deviated from the normal ignition timing.

(51) The misfire occurs in the range in which the fuel injection volume per ignition is small. This example represents the misfire in the low load range in which an error of the fuel volume and the air amount causes a large effect. It is hence estimated that the misfire is attributable to the abnormality in the fuel system.

(51-a) The intake pipe 6 has the crack or the like, and the air is induced in addition to the air amount measured by the air flow sensor 50a. Hence, the A/F ratio becomes so lean as to cause the misfire.

(51-b) Because of, e.g., a contact imperfection of the harness for the fuel injector 15, the voltage actually supplied to the fuel injector 15 is lower than the battery voltage recognized by the ECU 70, and the actual fuel injection volume is smaller than the value computed by the ECU 70. Hence, the A/F ratio becomes so lean as to cause the misfire.

(51-c) Because of the crack, the pipe disengagement, etc. of the line pipe through which the intake pipe pressure is introduced to the pressure regulator 23, the fuel pressure controlled by the pressure regulator 23 is always regulated with respect to the atmospheric pressure as the reference value instead of the intake pipe pressure at the downstream side of the throttle valve 5a, which corresponds to the atmospheric pressure of the fuel injector 15. Therefore, in the low load range in which the throttle opening degree is reduced and the negative pressure in the intake pipe is lowered, the fuel pressure in the fuel injector 15 is relatively raised and the fuel injection volume is overly increased. Hence, the A/F ratio becomes so rich as to cause the misfire.

(51-d) Because of, e.g., the contact imperfection of the harness for reading the battery voltage of the ECU 70, the battery voltage recognized by the ECU 70 is lower than the actual battery voltage. Therefore, the voltage actually supplied to the fuel injector 15 is higher than the compensated battery voltage based on the computation of the fuel injection volume executed in the ECU 70, and the fuel injection volume is overly increased as the result of the excessive compensation. Hence, the A/F ratio becomes so rich as to cause the misfire.

(51-e) The EGR valve 31 is seized at the open state due to, e.g., the deposition of carbon, thus resulting in such a condition that the EGR is always effective. Particularly, in the low load range in which the intake air amount is small, the fuel volume is overly increased due to the effect of the EGR. Hence, the A/F ratio becomes so rich as to cause the misfire.

(52) The misfire occurs in the range in which the fuel injection volume per ignition is large. This example represents the misfire in the high load range in which the fuel is supplied in an increased volume. It is hence estimated that any of problems given below occurs.

(52-a) The fuel cannot be delivered in a specified amount due to the trouble of the fuel pump 21, whereby the fuel pressure is lowered and the fuel injection volume from the fuel injector 15 is insufficient in the range in which the fuel injection volume is increased. Hence, the A/F ratio becomes so rich as to cause the misfire.

(52-b) The CPC valve 29 is seized in the open state, thus resulting in such a condition that the evaporating fuel is always purged. Particularly, in the high load range in which the evaporating gas is generated in the large amount, the fuel volume is overly increased. Hence, the A/F ratio becomes so rich as to cause the misfire.

(53) The misfire occurs in the operating condition in which the coolant temperature is low. This example represents the misfire in the condition in which the engine temperature is low. It is hence estimated that any of problems given below occurs.

(53-a) Heavy quality gasoline having the Reid Vapor Pressure (RVP) lower than that of a standard gasoline is used, and the misfire is caused due to a fouling of the spark plug 16.

(53-b) The heat index (heat radiation efficiency) of the spark plug 16 is not appropriate, and the misfire is caused due to smoldering of the spark plug 16.

Thereafter, the host computer acquires all kinds of the vehicle information in step S206, and confirms the changes of the parts and the systems with the lapse of time and computes the deteriorated conditions based on the initial vehicle information in step S207. Subsequently, the host computer proceeds to step S208 and estimates deterioration characteristics of the parts and the systems. For example, changes of the parts and the systems with the lapse of time are confirmed on the basis of changes of time sequence stored data of the on-board control unit, e.g., the changes of the learned value data, the input/output data under the preset conditions, or the control data (computation data). Then, by comparing the initial vehicle information obtained by the line end inspection with the relevant data transmitted from the user, the progress of the deterioration of the parts and the systems is computed.

Next, the host computer proceeds to step S209 in which the remaining life (durability) of each part is estimated from the deteriorated conditions of the parts and the systems. Then, in step S210, the timing at which the relevant part should be subjected to a service is computed. In step S211, the user is notified of the determination results including the locations to be repaired or checked and the service timing. In step S212, a dealer's service factory, for example, is notified of various kinds of the information such as the vehicle information, the notice information sent to the user, the service procedures, and the service parts (parts to be prepared). Subsequently, the host computer proceeds to step S213 in which the various kinds of information are recorded in the database DB along with the recording data for each vehicle based on the vehicle identification number and the user ID code. The information processing routine is thereby brought into an end.

Stated otherwise, the following is the case of that the diagnosis target is the actuator of the engine system, when the actuator is determined as being normal with the on-board diagnosis on the vehicle side, but the diagnosis result is close to the trouble determination level. The host computer receives from the vehicle, not only the diagnosis parameters such as the control variables of the actuator, the input parameter to be changed with operation of the actuator, and the predetermined threshold value for use in the trouble determination, but also the operating status and the control status during the diagnosis or before and after the diagnosis. The host computer can confirm at which level the current actuator condition is with respect to the trouble determination level. It is hence possible to determine whether the trouble will occur in the near future, taking into account the estimated deteriorated conditions of the individual parts as well.

The following is the case of that the diagnosis target is a sensor of the engine system, when the sensor is determined as being normal with the on-board diagnosis on the vehicle, but the diagnosis result is at a point within the setted range close to the trouble determination level. The host computer receives, from the vehicle side, not only the diagnosis parameters such as the input value from the sensor, other related parameters, and the predetermined threshold value for use in the trouble determination, but also the operating status and the control status during the diagnosis or before and after the diagnosis. The host computer can confirm at which level the current sensor condition is with respect to the trouble determination level. It is hence possible to determine whether the trouble will occur in the near future, taking into account the estimated deteriorated conditions of the individual parts as well.

The following is the case of that the diagnosis target is an A/F sensor of the engine system, when the A/F sensor is determined as being normal with the on-board diagnosis on the vehicle side, but the diagnosis result is at a point within the setting range close to the trouble determination level. The host computer receives, from the vehicle side, not only the diagnosis parameters such as the input value from the sensor, other related parameters, and the predetermined threshold value for use in the trouble determination, but also the operating status and the control status during the diagnosis or before and after the diagnosis. The host computer can confirm at which level the current A/F-sensor condition is with respect to the trouble determination level. It is hence possible to determine whether the trouble will occur in the near future, taking into account the estimated deteriorated conditions of the individual parts as well.

The following is the case of that the diagnosis target is a wiring system including input/output units such as sensors and actuators, when the wiring system is determined as being free from disconnection/short-circuit with the on-board diagnosis on the vehicle side, but disconnection/short-circuit intermittently occurs in a short time. The host computer receives, from the vehicle side, the number of times of the occurrence of disconnection/short-circuit, the signal levels of voltage, current, etc. in the wiring system for the diagnosis target, and the operating status and the control status during the diagnosis or before and after the diagnosis. The host computer can confirm at which level the current condition of the wiring system is with respect to the trouble determination level. It is hence possible to determine whether a trouble will occur in near future, taking into account the estimated deteriorated conditions of the individual parts as well.

The following is the case of that the diagnosis target is the thermostat 36 of the engine cooling system, when the thermostat 36 is determined as being normal with the on-board diagnosis on the vehicle side, but the diagnosis result is at a point within the setting range close to the trouble determination level. The host computer receives, from the vehicle side, not only the diagnosis parameters such as the engine-generating heat value, the engine-radiating heat value, the estimated coolant temperature, the actual coolant temperature, and the predetermined threshold value, but also the operating status and the control status during the diagnosis or before and after the diagnosis. The host computer can confirm at which level the current condition of the engine cooling system is with respect to the trouble determination level. It is hence possible to determine whether the trouble will occur in the near future, taking into account the estimated deteriorated conditions of the individual parts as well. The diagnosis target may be other than the thermostat 36. For example, when there occurs a phenomenon that, during the idle operation, the coolant temperature is not lowered even with the radiator fan relay 86 being turned on to switch over the relay contact from the open to the closed state, such a phenomenon can be determined as indicating a motor trouble of the radiator fan 48 or a relay contact imperfection of the radiator fan relay 86.

The following is the case of that the diagnosis target is the fuel system, when the fuel system is determined as being normal with the on-board diagnosis on the vehicle side, but the diagnosis result is at a point within the setting range close to the trouble determination level. The host computer receives, from the vehicle side, not only the diagnosis parameters such as the A/F ratio learned value, the A/F ratio feedback value, the A/F ratio diagnosis value fsobd as the sum of the two former values, and the first and second predetermined thresholds values, but also the operating status and the control status during the diagnosis or before and after the diagnosis. The host computer can confirm at which level the current condition of the fuel system is with respect to the trouble determination level. It is hence possible to determine whether the trouble will occur in the near future, taking into account the estimated deteriorated conditions of the individual parts as well.

The following is the case of that the diagnosis target is a catalyst for cleaning exhaust gas, when the catalyst is determined as being not yet degraded with the on-board diagnosis on the vehicle side, but the diagnosis result is at a point within the setting range close to the trouble determination level. The host computer receives, from the vehicle side, not only the diagnosis parameters such as the number of times of reversals in output value of the front A/F sensor 56, the number of times of reversals in output value of the rear A/F sensor 57, the ratio between both values of the number of times of output value reversals, and the predetermined threshold value, but also the operating status and the control status during the diagnosis or before and after the diagnosis. The host computer can confirm at which level the current catalyst function of cleaning exhaust gas is with respect to the trouble determination level. It is hence possible to determine whether the exhaust gas cleaning function will degrade in the near future to the level at which the catalyst is determined as being degraded, taking into account the estimated deteriorated conditions of the individual parts as well.

The following is the case of that the diagnosis target is the purge system, when the purge system is determined as causing no leak with the on-board diagnosis on the vehicle side, but the diagnosis result is at a point within the setting range close to the trouble determination level. The host computer receives, from the vehicle side, not only the diagnosis parameters such as the estimated amount of evaporating gas generated in the purge system, the pressure in the system, the change of the pressure in the system, the predetermined threshold value (leak determination level), but also the operating status and the control status during the diagnosis or before and after the diagnosis. The host computer can confirm at which level the current condition of the purge system is with respect to the trouble determination level. It is hence possible to specify which part will cause the trouble in the near future, taking into account the estimated deteriorated conditions of the individual parts as well.

The following is the case of that the diagnosis target is the EGR system, when the EGR system is determined as being normal with the on-board diagnosis on the vehicle side, but the diagnosis result is close to the trouble determination level. The host computer receives, from the vehicle side, the diagnosis parameters for the EGR system and the operating status and the control status during the diagnosis or before and after the diagnosis. The host computer can confirm at which level the current condition of the EGR system is with respect to the trouble determination level. It is hence possible to determine whether the trouble will occur in the near future, taking into account the estimated deteriorated conditions of the individual parts as well. For example, when it is confirmed that the current diagnosis result of the EGR system is very close to the trouble determination level and the vehicle information indicates the situation in which the vehicle runs just short distances in most cases and repeats the start and the stop before reaching a sufficient warm-up of the engine, a substantial amount of the carbon is conceivably deposited in the EGR passage 30 and the EGR valve 31. The occurrence of the abnormality in near future can be therefore easily predicted.

The following is the case of that the diagnosis target is the engine ignition system, when a misfire is determined as being not caused with the on-board diagnosis on the vehicle side, but there is a possibility of the occurrence of a misfire in near future. The host computer receives, from the vehicle side, not only the misfire diagnosis parameters such as the engine speed in the predetermined crank angle, the difference between the previous and current engine speeds, and the predetermined threshold value, but also the operating status and the control status during the diagnosis or before and after the diagnosis. The host computer can confirm at which level the current engine combustion condition is with respect to the misfire occurrence level. It is hence possible to estimate the time at which the misfire will probably occur, taking into account the estimated deteriorated conditions of the other parts as well.

Then, the deterioration tendency of the parts for each vehicle, the estimated result of the trouble part, the time or mileage (distance traveled) until the occurrence of trouble, the effect upon exhaust gas emissions, etc. are fed back to the related departments, thereby confirming the propriety of the respective functions of the actuators, the sensors, the wiring system, the cooling system, the fuel system, the catalyst, the purge system, the EGR system, and the ignition system. It is therefore possible to improve reliability and durability, and to evaluate both diagnosis specifications and engine controllability.

As a result, an advance (beforehand) notice of the check timing can be given to the user before the occurrence of the abnormality, and the cost and time required for the repair can be reduced. Furthermore, on the service factory side, advance (beforehand) order of corresponding parts and smooth proceeding of work schedules can be realized on the basis of the distributed diagnosis information.

According to the vehicle control system of the present invention, as described above, conditions of the power systems mounted on the vehicles are controlled in a concentrated (synthetic) manner for effective utilization, and an advance (beforehand) notice of the check timing can be given to each user before the occurrence of the trouble. Also, feeding back the information under the control of the related departments contributes to improve the system reliability through evaluation of both diagnosis specifications and engine controllability.

It is clearly understood that various embodiments of the present invention can be practiced in different ways over a wide range in accordance with the concept of the present invention without departing from the spirit or scope of the invention. Hence, the present invention is not limited to those precise embodiments, but should be construed as defined in the appended claims.

What is claimed is:

1. A vehicle management system for monitoring vehicle maintenance conditions, comprising:
- a self-diagnosing system mounted on a vehicle for monitoring a control system by an on-board diagnosis apparatus and for storing a diagnosis information with first data related to a target diagnosis when an abnormality is recognized and second data being close to a trouble determination level even though within a normal range;
- a data communication system for transmitting said diagnosis information to an outside receiver via a wireless communication;
- an external database system for receiving to accumulate said diagnosis information; and
- a network system for analyzing said second data and for distributing an analyzed result to at least one of a user of the vehicle and a department with an access right to said database system.

2. The vehicle control system according to claim 1, wherein said diagnosis information contains at least one of parameters of said control system.

3. The vehicle management system according to claim 2, wherein said diagnosis information contains said data obtained during an execution of diagnosis operations.

4. The vehicle management system according to claim 2, wherein said diagnosis information contains said data obtained in a predetermined period from a start to an end of diagnosis operations.

5. The vehicle management system according to claim 1, wherein said diagnosis information contains said data obtained during an execution of diagnosis operations.

6. The vehicle management system according to claim 1, wherein said diagnosis information contains said data obtained in a predetermined period from a start to an end of diagnosis operations.

7. The vehicle management system according to claim 1, wherein said diagnosis information contains an actuator information determined as being abnormal on the basis of a variance of a parameter accompanied with operations of said actuator.

8. The vehicle management system according to claim 1, wherein said diagnosis information contains a cooling system information determined as being abnormal on the basis of a difference between a temperature at a drive condition and an actual temperature.

9. The vehicle management system according to claim 1, wherein said diagnosis information contains an evaporating purge system information determined as being abnormal on the basis of a pressure change in said evaporating purge system.

10. The vehicle management system according to claim 1, wherein said diagnosis information contains a sensor information determined as being abnormal on the basis of a rationality between an output value of said sensor and a value assumed from a parameter related to a detection parameter of said sensor.

11. The vehicle management system according to claim 1, wherein said diagnosis information contains a fuel system information determined as being abnormal on the basis of a diagnosis value indicative of an A/F ratio control state.

12. The vehicle management system according to claim 1, wherein said diagnosis information contains diagnosis information of a wiring and input/output units connected to said wiring determined as being abnormal in dependency on whether an input/output continue to be deviated from a prescribed range in a specification.

13. The vehicle management system according to claim 1, wherein said diagnosis information contains diagnosis information of a catalyst for cleaning exhaust gas determined as being abnormal on the basis of a ratio of an inversion period of an output value of an A/F ratio sensor at an upstream side and at a downstream of said catalyst for cleaning exhaust gases of an engine.

14. The vehicle management system according to claim 1, wherein said diagnosis information contains an A/F ratio sensor information determined as being abnormal on the basis of a time to reach a target A/F ratio or an inversion time of a sensor output value.

15. The vehicle management system according to claim 1, wherein said diagnosis information contains a recirculating exhaust gas system information determined as being abnormal on the basis of an amount of variance in either one of an intake air amount, an intake pipe pressure or an EGR gas temperature accompanied with an executing/halting of recirculating exhaust gas.

16. The vehicle management system according to claim 1, wherein said diagnosis information contains a misfire diagnosis information of an ignition system determined by whether a misfire of said ignition system occurs or not on the basis of a difference in a rotational rate of an engine between cylinders in a predetermined crank angle interval.

17. The vehicle management system according to claim 1, wherein said diagnosis information contains diagnosis information of a sensor determined as being abnormal on the basis of output values of sensors.

* * * * *